(12) United States Patent
Moody

(10) Patent No.: US 11,312,513 B2
(45) Date of Patent: *Apr. 26, 2022

(54) MICROMETEOROID AND ORBITAL DEBRIS SHIELD PILLOW FOR PROTECTING FLEXIBLE THIN-WALLED STRUCTURES FROM THROUGH-AND-THROUGH PENETRATION DAMAGE

(71) Applicant: The Boeing Company, Chicago, IL (US)

(72) Inventor: Tristan C. Moody, Houston, TX (US)

(73) Assignee: The Boeing Company, Chicago, IL (US)

( * ) Notice: Subject to any disclaimer, the term of this patent is extended or adjusted under 35 U.S.C. 154(b) by 106 days.

This patent is subject to a terminal disclaimer.

(21) Appl. No.: 16/829,298

(22) Filed: Mar. 25, 2020

(65) Prior Publication Data
US 2021/0300600 A1    Sep. 30, 2021

(51) Int. Cl.
*B64G 1/56* (2006.01)
*B32B 5/26* (2006.01)

(52) U.S. Cl.
CPC . *B64G 1/56* (2013.01); *B32B 5/26* (2013.01)

(58) Field of Classification Search
None
See application file for complete search history.

(56) References Cited

U.S. PATENT DOCUMENTS

| 5,601,258 | A  | * | 2/1997  | McClymonds | B64G 1/22 244/171.7 |
| 5,610,363 | A  | * | 3/1997  | Crews | F41H 5/0457 89/36.02 |
| 6,298,765 | B1 | * | 10/2001 | Dvorak | B64G 1/56 89/36.02 |
| 6,547,189 | B1 | * | 4/2003  | Raboin | B64G 1/12 244/158.3 |
| 6,899,009 | B2 | * | 5/2005  | Christiansen | E06B 9/00 89/36.02 |
| 10,571,226 | B2 |  | 2/2020  | Mavencamp | |
| 2005/0284986 | A1 | * | 12/2005 | Bigelow | B64G 1/56 244/171.7 |
| 2019/0047234 | A1 | * | 2/2019  | Stone | B29C 66/7315 |

FOREIGN PATENT DOCUMENTS

WO    0035753 A1    6/2000

OTHER PUBLICATIONS

Wikipedia, "Whipple shield", pp. 1-2, retrieved on Aug. 16, 2019, retrieved from internet http://en.wikipedia.org/wiki/Whipple_shield.

* cited by examiner

*Primary Examiner* — Richard G Davis
(74) *Attorney, Agent, or Firm* — Coats & Bennett, PLLC

(57) ABSTRACT

Segmented shields are disclosed comprising material combinations and rolled configurations to impede and mitigate through-and-through penetration damage of a structure incorporating the segmented shields from the damage resulting from the impact of high-velocity micro-meteoroids and orbital debris particulate.

20 Claims, 18 Drawing Sheets

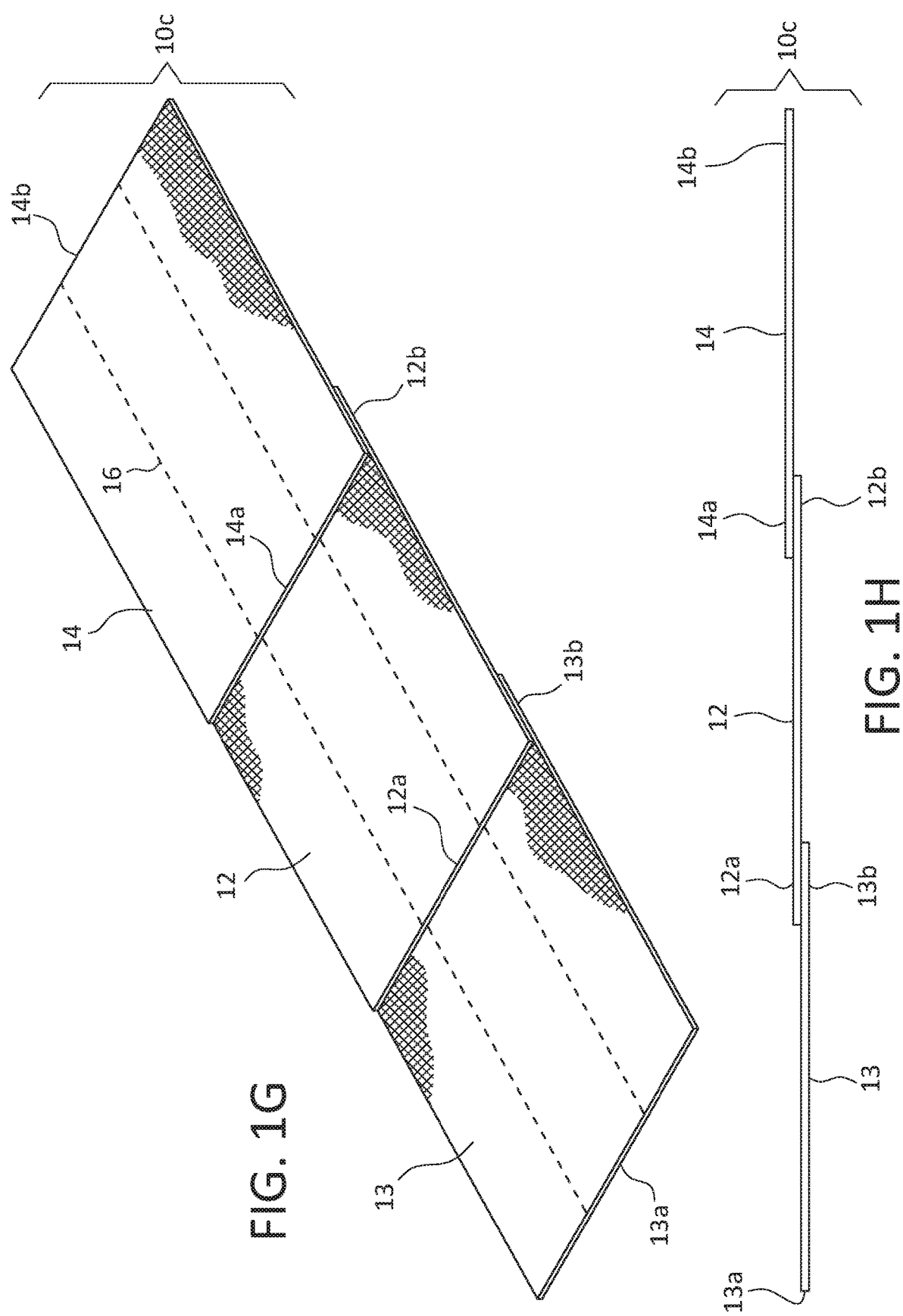

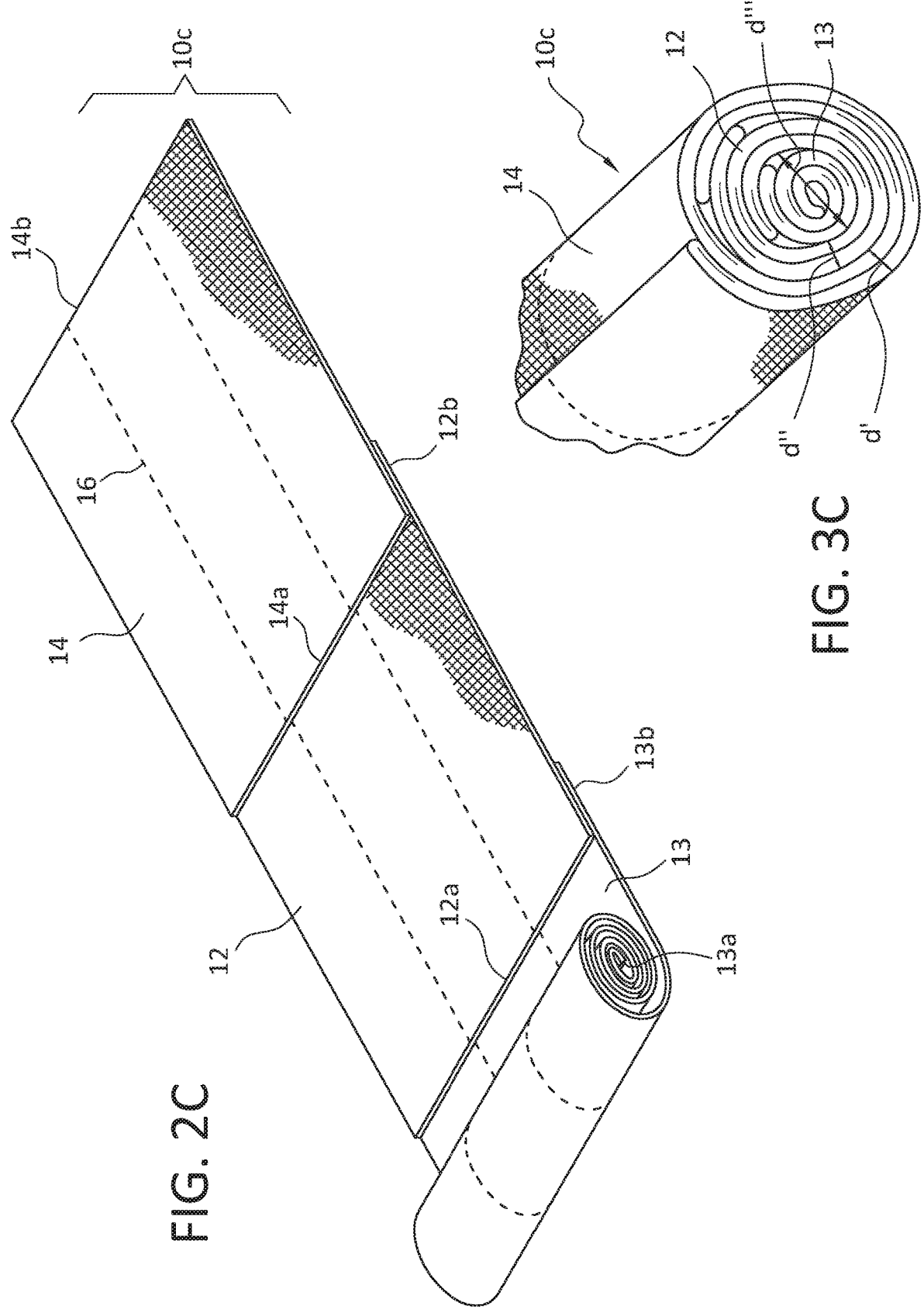

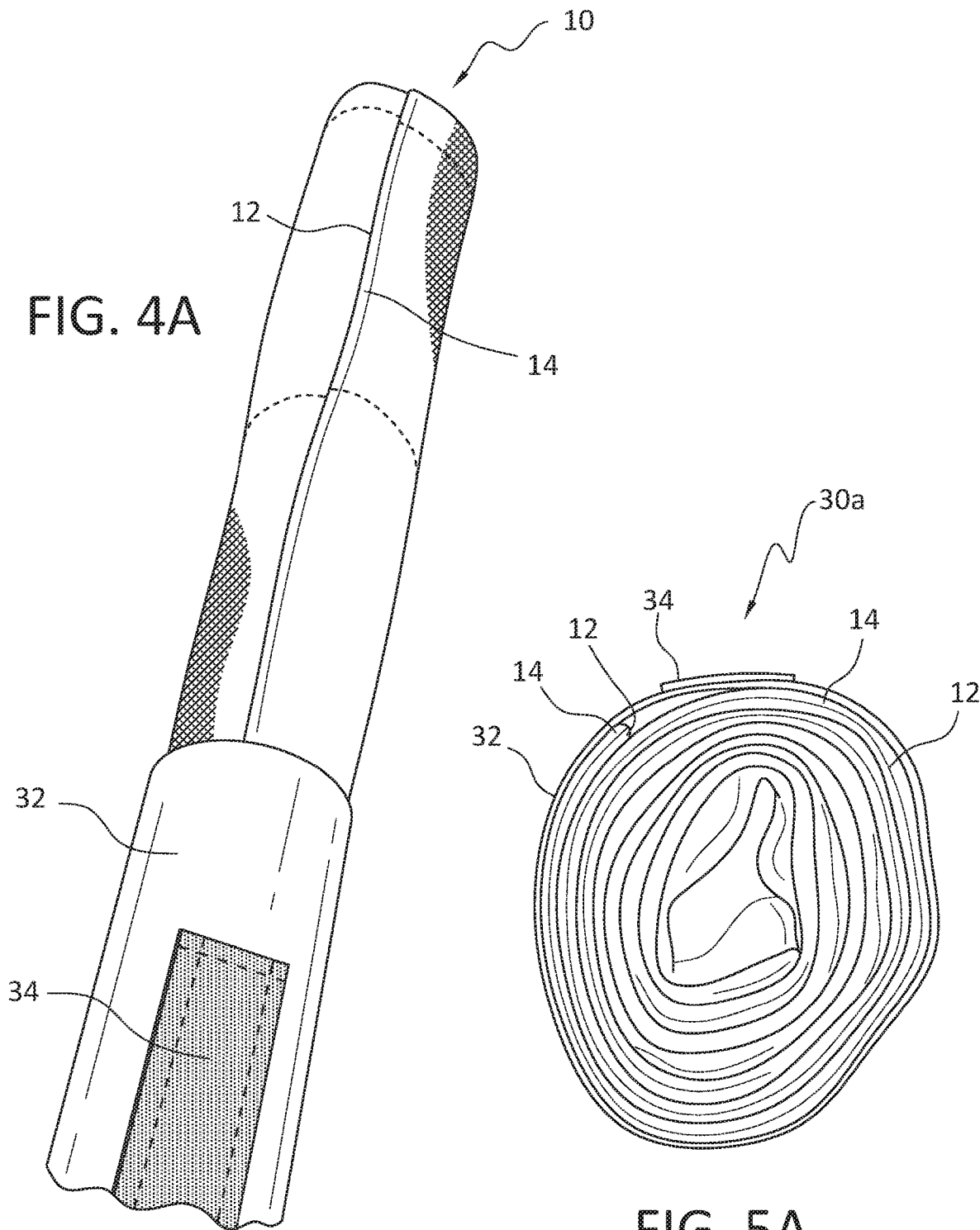

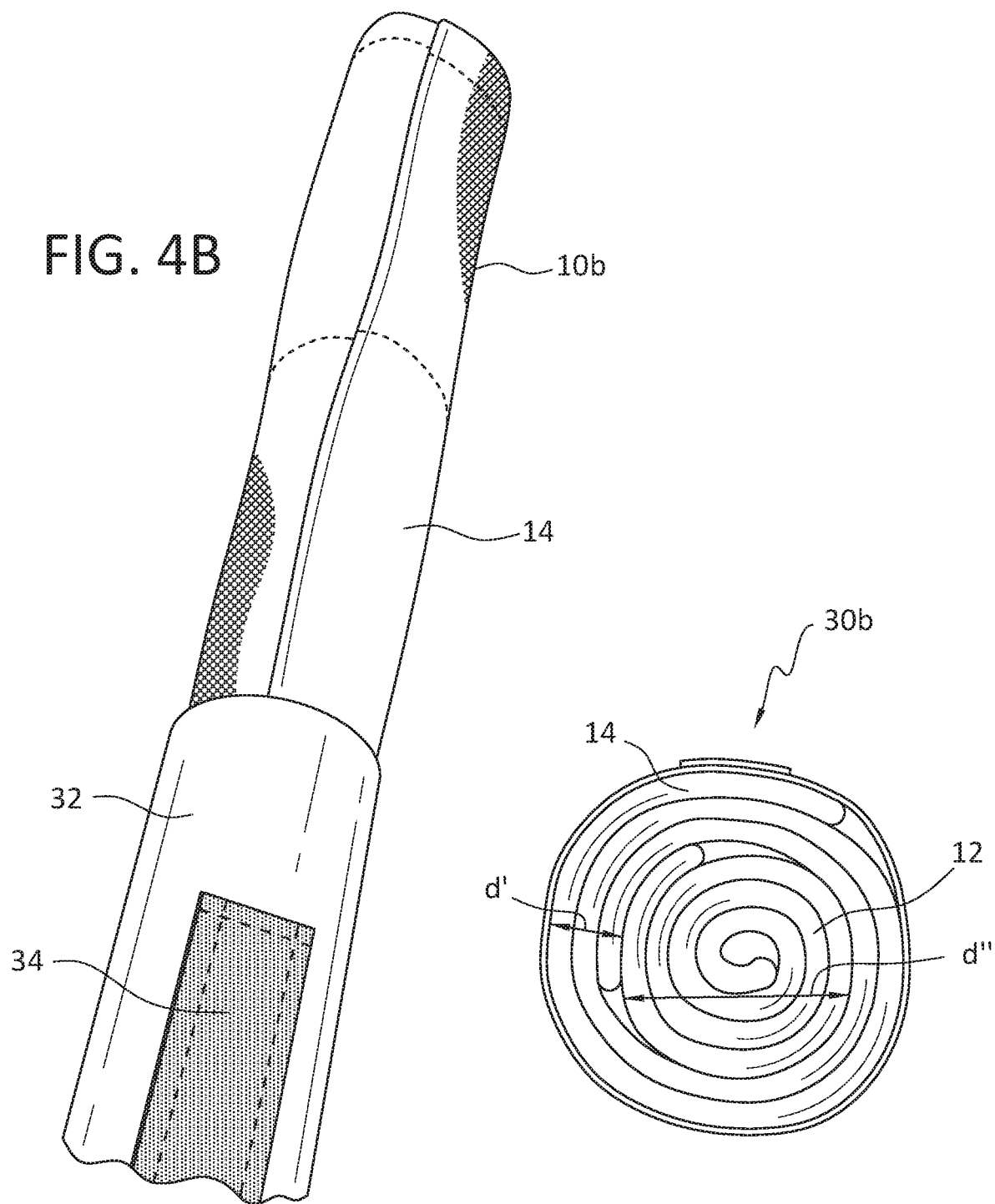

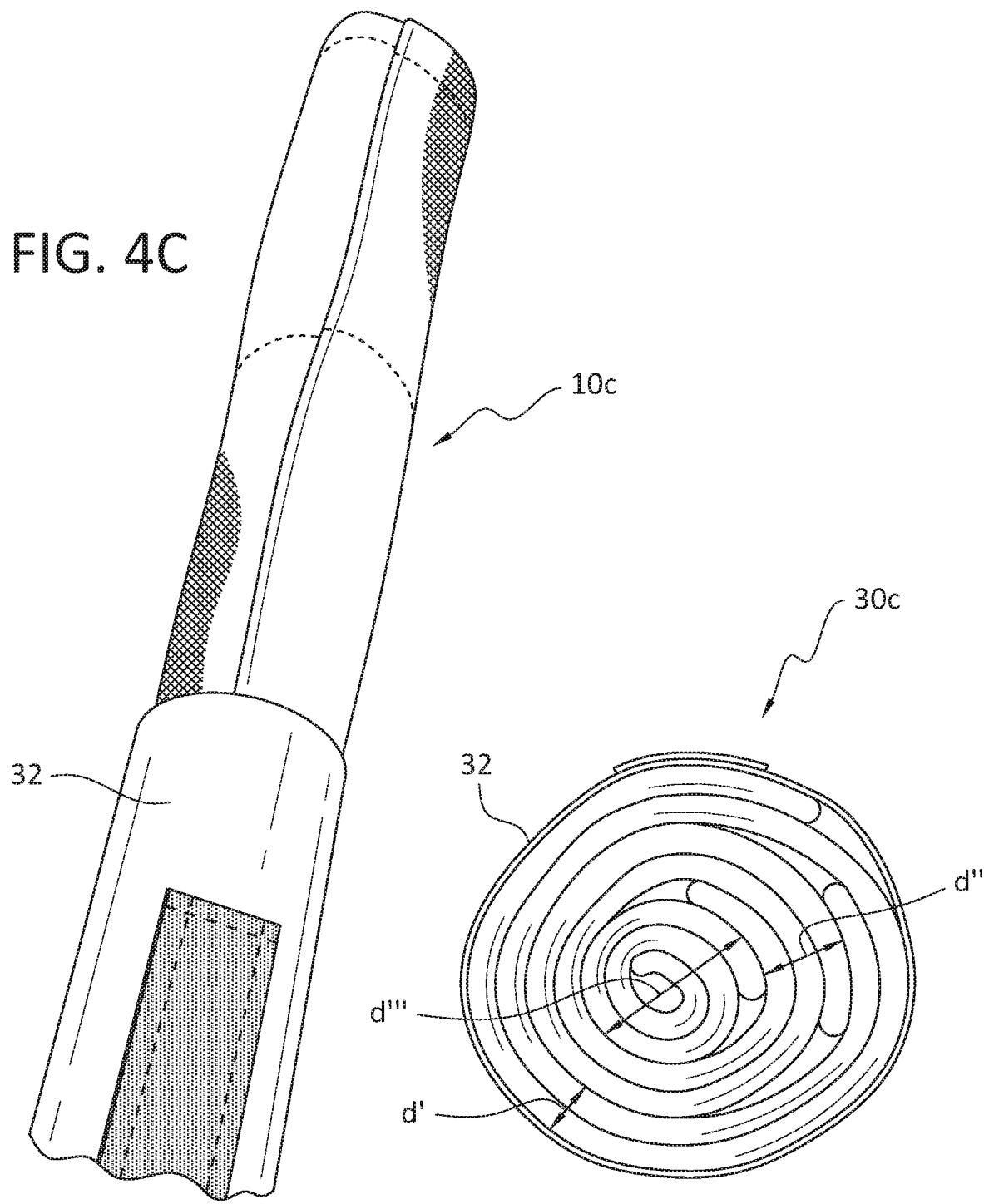

MICROMETEOROID AND ORBITAL DEBRIS SHIELD PILLOW FOR PROTECTING FLEXIBLE THIN-WALLED STRUCTURES FROM THROUGH-AND-THROUGH PENETRATION DAMAGE

GOVERNMENT RIGHTS

Aspects described herein were made in the performance of work under NASA Contract No. NAS15-10000 and is subject to the provisions of Section 305 of the National Aeronautics and Space Act of 1958 (72 Stat.435: 42 U.S.C. § 2457.)

TECHNOLOGICAL FIELD

The present application relates generally to the field of damage prevention for structures vulnerable to collision with high velocity particles. More specifically, the present disclosure relates to the field of inhibiting damage to structures in space and mitigating damage to structures in space incurred by impacting particles at high velocities.

BACKGROUND

Spacecraft and satellites are exposed to harsh environments that can include confronting and otherwise being exposed to particles travelling at high velocities. Such particles can be associated with space debris and can further include particles referred to as micrometeoroids.

Certain exterior structures that will be exposed to a space environment are manufactured with concern paid to the weight of the exterior structure and the overall weight of the object comprising the exterior structure. Accordingly, such weight-sensitive structures are often thin-walled structures that can be susceptible to damage when high velocity space particulate material impacts such structures at the high velocities; with the velocity of such particles achieving velocities ranging in excess of 1 km/sec.

Further, complex deployment protocols of various structures, in addition to the weight considerations of such structures, has complicated the successful development of impact-resistant structures, as well as the development of protective devices that can co-deploy with an at-risk structure, and that can ameliorate the effect of high velocity particle impact on structures and components that are considered necessary for successfully conducting space missions.

SUMMARY

According to present aspects, shield segment precursors, a shield segments, and segmented shields are disclosed to, fortify an object in a space environment, with the shield segment precursors, shield segments, and segmented shields including a first material component, with the first material component having a tensile strength of at least about 3620 MPa, and with the first material component having a relative density of about 1.44. According to a present aspect, the first material component includes a first fiber material.

Presently disclosed shield segment precursors, shield segments, and segmented shields further include a second material component, with the second material component including a second fiber material that can be a continuous filament ceramic material, and with the second material component configured to substantially surround the first material component.

In a further aspect, the first fiber material includes a first fiber material first side and a first fiber material second side, with the first material first side substantially covered with a predetermined amount of open cell foam material and the first material second side substantially covered with the second fiber material.

In another aspect, a shield segment is disclosed, with the shield segment including a first material component, with the first material component including a first fiber material, and with the first fiber material having a tensile strength of at least about 3620 MPa and a relative density of about 1.44, said first material component having a first material component thickness; and a second material component, said second material component including a second fiber material that is different from the first fiber material, said second fiber material comprising a continuous filament ceramic material, said second material component having a second material component thickness, said second material component configured to substantially surround the first material component. The shield segment further includes a third material component, with the third material component including a third fiber material, said third fiber material including a silica fiber cloth material, and with the third fiber material configured to substantially surround the second fiber material to form the shield segment.

In another aspect, the first material component is configured into a rolled configuration including the first material component thickness, with the rolled configuration further comprising an inner core, and with the inner core bounded by the first material component, and the second material component is configured into a rolled configuration about the first material component thickness, to form a shield segment, with the second material component comprising a second material component thickness.

In another aspect, the shield segment further includes a predetermined amount of open cell foam material, said open cell foam material oriented within the inner core, and with the predetermined amount of open cell foam material substantially surrounded by the first material component in the rolled configuration.

In another aspect, the shield segment further includes a third material component, with third material component including a silica fiber material, and with the third material component configured to substantially surround the second fiber material component. According to a present aspect, the third material component includes a third fiber material that can be a silica fiber cloth material.

In another aspect, a plurality of shield segments is oriented together to form a segmented shield.

In another aspect, the first material component includes poly-paraphenylene terephthalamide.

In another aspect, the second material component includes aluminum oxide.

In a further aspect, the second material component includes a continuous filament aluminum oxide material.

In another aspect, the third material component includes a silica fiber cloth material.

In a further aspect, the third material component includes polytetrafluoroethylene that can be in the form of a polytetrafluoroethylene coating.

In another aspect, the first material component is made from a predetermined number of layers of from about 70 to 80 layers, with the first material component used to form a shield including from about 3 to about 5 layers of first fiber material. That is, a first fiber material is laid up from about to about 5 layers thick to make a flat pattern. According to present aspects, this 3 to 5 layer-thick first material component is then rolled up upon itself, such that the total layer count across a diameter of first material component that forms a predetermined thickness of first material component results in approximately 70 layers of first fiber material forming the first material component.

In another aspect, the second material component includes a predetermined number of second fiber material layers (e.g., from about 2 to about 3 layers of second fiber material) that are then rolled to cover the first material component thickness, with the number of second material component layers for a second material component thickness ranging from about 8 to about 12 layers thick.

According to another present aspect, an apparatus is disclosed, with the apparatus including a housing, with the housing comprising a housing inner surface and a housing outer surface, and further including a segmented shield positioned proximate to the housing inner surface. A plurality of shield segments can be oriented together to form the segmented shield. The shield segments and the segmented shield include a first material component that includes a first fiber material, with the first material component having a tensile strength of at least about 3620 MPa, and with the first material component having a relative density of about 1.44. The shield includes a second material component that includes a second fiber material, with the second fiber material including aluminum oxide fibers. The second material component is configured to surround the first material component. The shield segments further include a third material component, with the third material component including a silica fiber cloth material, and with the third material component configured to surround the second material component.

In another aspect, the shield segment includes a shield segment inner surface and a shield segment outer surface, with the shield segment outer surface positioned proximate to the housing inner surface.

In another aspect, the shield segment includes a predetermined amount of open cell foam material oriented with the open cell foam material substantially surrounded by the first material component.

In another aspect, the housing is substantially cylindrical.

In another aspect, a plurality of shield segments is configured on the housing inner surface to form a segmented shield to prevent an impacting particle that breaches a first section of the housing from subsequently breaching a second section of the housing, and wherein the particle has an average diameter of from about 3 mm to about 10 mm, or more, and wherein the particle travels at a velocity ranging from about 1 km/sec. to about 70 km/sec.

In another aspect, the segmented shield forms a segmented shield perimeter said segmented shield perimeter forming a complete segmented shield boundary or an incomplete segmented shield boundary within the housing.

In a further aspect, the housing is configured to convert from a planar housing stowed state to a cylindrical housing deployed state.

In another aspect, the shield segments in the housing stowed state are configured to form a segmented shield in the housing deployed state.

In a further aspect, the plurality of shield segments in the housing stowed state are spaced apart a predetermined distance.

Another present aspect discloses an object that can be a vehicle, with the object including an apparatus, and with the apparatus including a housing, with the housing comprising a housing inner surface and a housing outer surface and a segmented shield positioned proximate to the housing inner surface. The segmented shield includes a plurality of shield segments, with the shield segments including a first material component, with the first material component having a tensile strength of at least about 3620 MPa, and with the first material component having a relative density of about 1.44. The shield segments further include a second material component, with the second material component including aluminum oxide fibers, with the second material component configured to surround the first material component. The shield segments further include a third material component, with the third material component comprising a silica fiber cloth component, with the third component configured to surround the second material component.

In another aspect, the vehicle is selected from at least one of: a crewed aircraft; an uncrewed aircraft; a crewed spacecraft; an uncrewed spacecraft; a crewed rotorcraft; an uncrewed rotorcraft; a crewed satellite, an uncrewed satellite; a crewed terrestrial vehicle; an uncrewed terrestrial vehicle; a crewed surface waterborne vehicle; an uncrewed surface waterborne vehicle; a crewed sub-surface waterborne vehicle; an uncrewed sub-surface waterborne vehicle, a hovercraft, and combinations thereof.

According to a further present aspect, a method of making the disclosed shield segment is disclosed, with the method including providing a predetermined number of first material component layers that include a first fiber material, and including a first material component leading edge and a first material component trailing edge. The first material component has a tensile strength of at least about 3620 MPa and a relative density of about 1.44. The method further includes providing a predetermined number of second material component layers that include a second fiber material that is different from the first fiber material, with the second material component different from the first material component, and including a second material component leading edge and a second material component trailing edge, with the second material component including aluminum oxide fibers. The method further includes adjoining the first material component trailing edge and the second material component leading edge, and rolling the first material component to form a predetermined first material component thickness, and then continuing the process by rolling the second material component to substantially surround the first material component while forming a predetermined second material component thickness that surrounds the first material component thickness to form a shield segment precursor. The method further includes providing a third material component, with the third material component including a third fiber material different from the first and second fiber materials, with the third material component including a predetermined amount of silica fiber cloth material, and substantially surrounding the second material component with the third material component to form the shield segment.

According to another aspect, a method is disclosed where, before the step of adjoining the first and second material components, providing an amount of open cell foam material that includes an open cell foam material leading edge and an open cell foam material trailing edge and adjoining the open cell foam material trailing edge and the first material component leading edge, and first rolling the open cell foam material to form an open cell foam material thickness. The method then includes rolling the first material component over the open cell foam material thickness to substantially surround the open cell foam material thickness with the first material component.

In another aspect, the trailing edge of the open cell foam material overlaps the leading edge of the first material component.

According to another present aspect, a method for preventing through-and-through penetration of a housing is disclosed, with the method including providing a housing, with the housing including a housing inner surface and a housing outer surface, and orienting a segmented shield proximate to the housing inner surface. The segmented shield includes a plurality of shield segments to form the segmented shield, with shield segments including a first material component that includes a first fiber material, with the first material component having a tensile strength of at least about 3620 MPa, and with the first material component having a relative density of about 1.44. The shield includes a second material component that includes a second fiber material, with the second fiber material including aluminum oxide fibers. The second material component is configured to surround the first material component.

In another aspect, a predetermined amount of open cell foam is oriented within and substantially surrounded by the first material component, with the first material component substantially surrounding the second material component.

In another aspect, the shield includes a third material component, with the third material component including a silica fiber cloth component, and with the third material component configured to surround the second material component.

The segmented shield further includes a segmented shield inner surface and a segmented shield outer surface, with the segmented shield outer surface positioned or otherwise oriented proximate to the housing inner surface.

The features, functions and advantages that have been discussed can be achieved independently in various aspects or may be combined in other aspects, further details of which can be seen with reference to the following description and the drawings.

BRIEF DESCRIPTION OF THE DRAWINGS

Figure 1A:
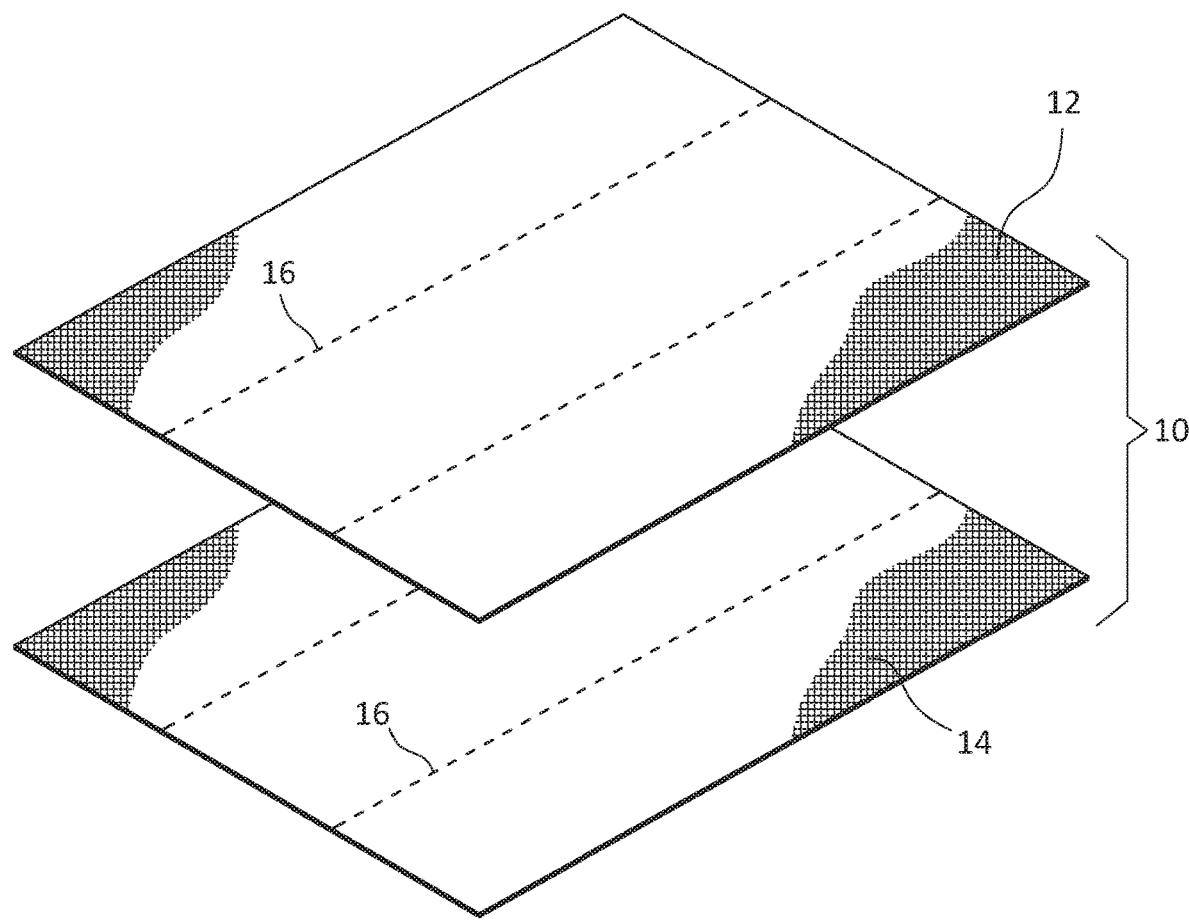
Figure 1B:
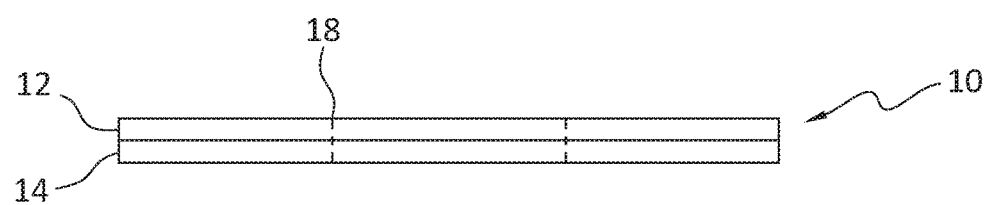
Figure 1C:
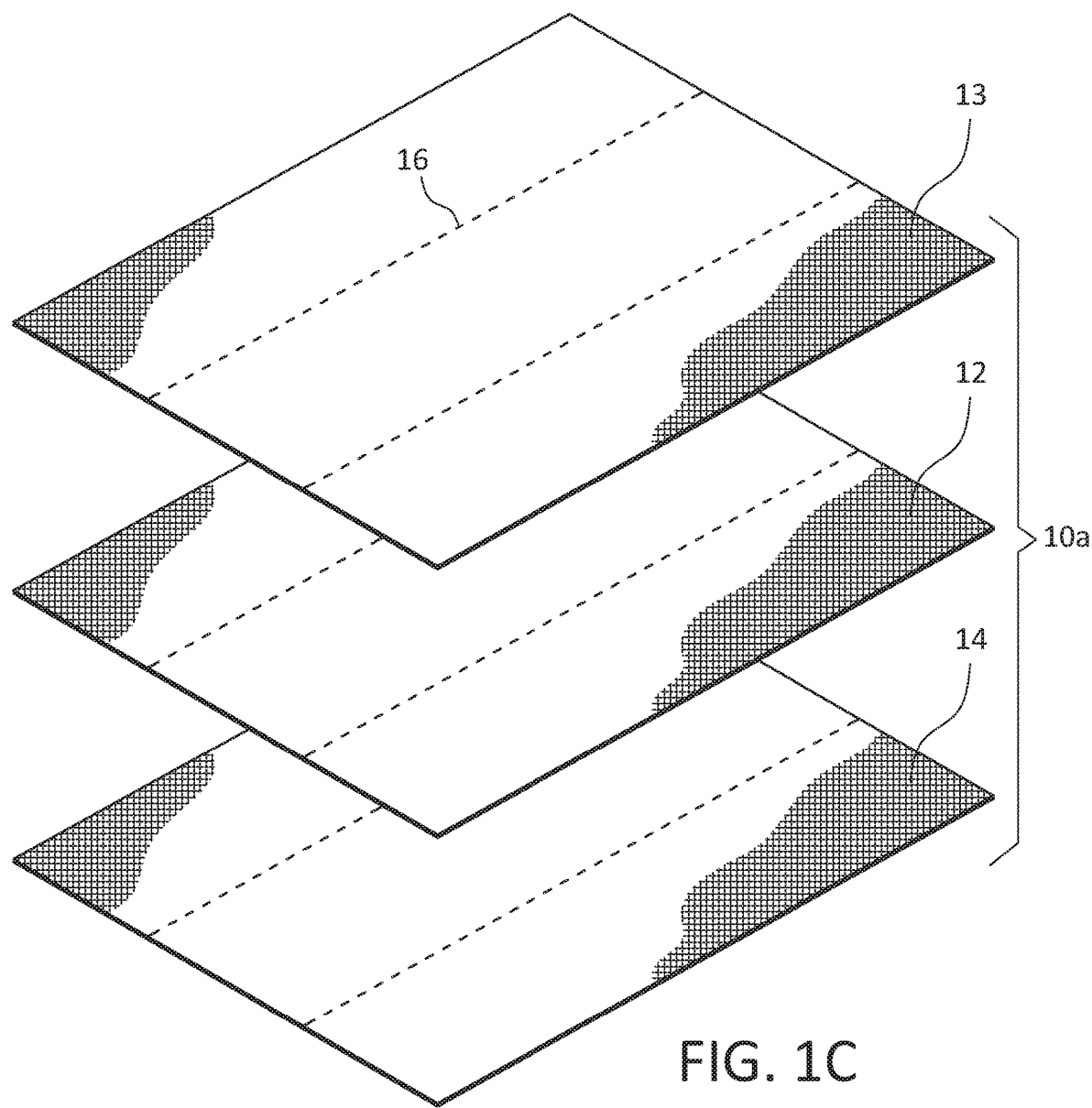
Figure 1D:
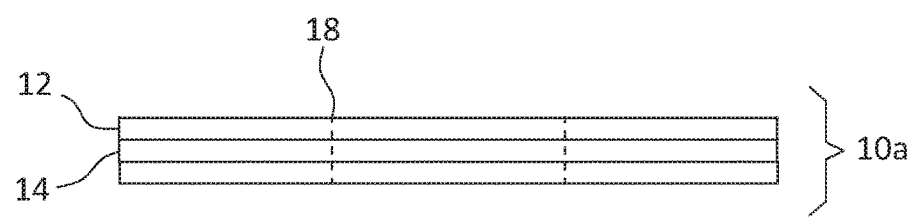
Figure 1E:
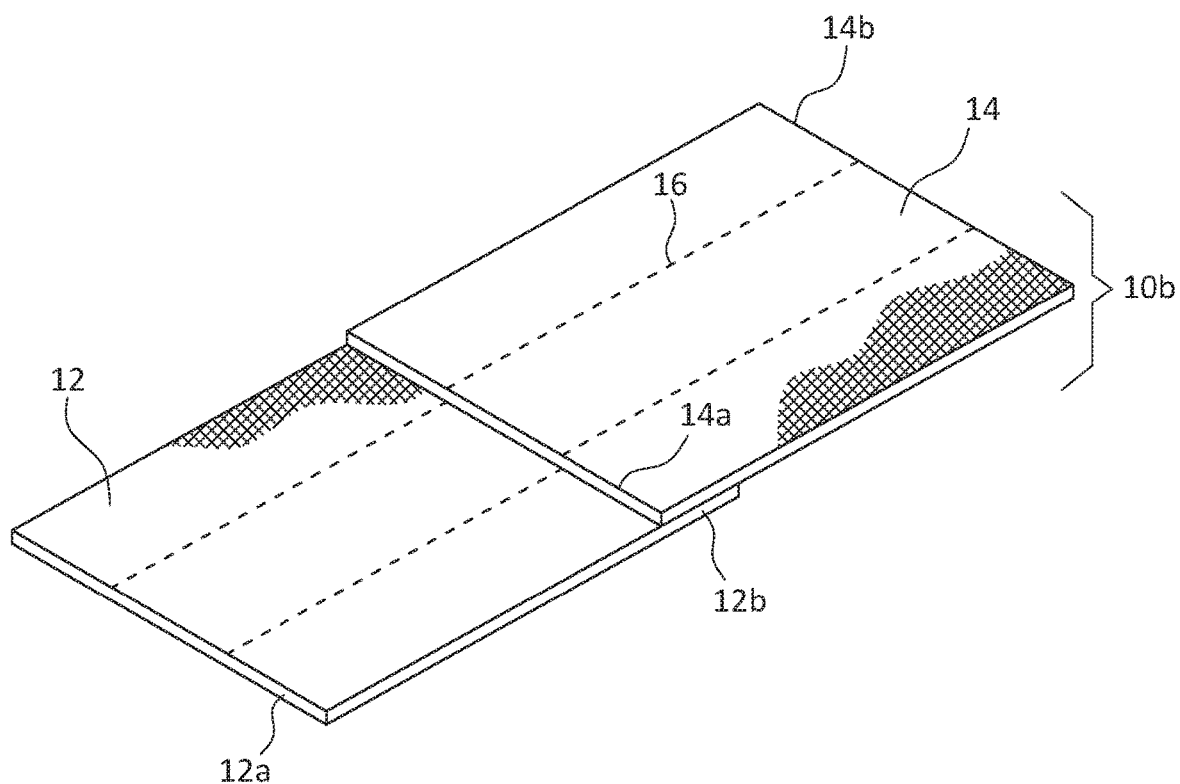
Figure 1F:
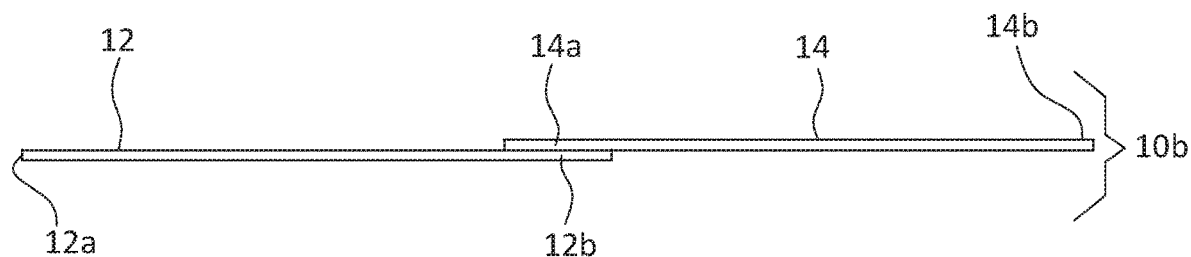
Figure 2A:
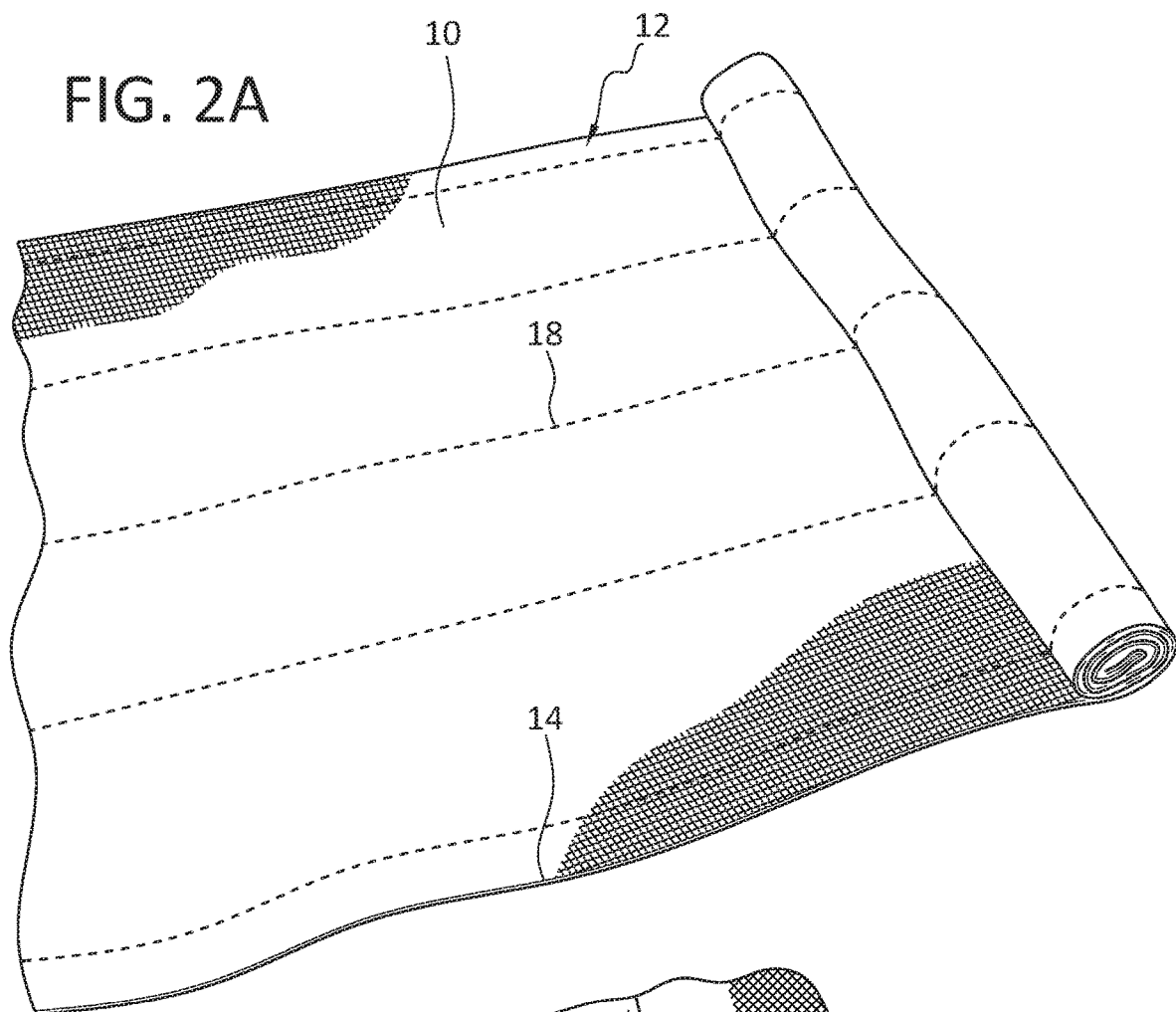
Figure 3A:
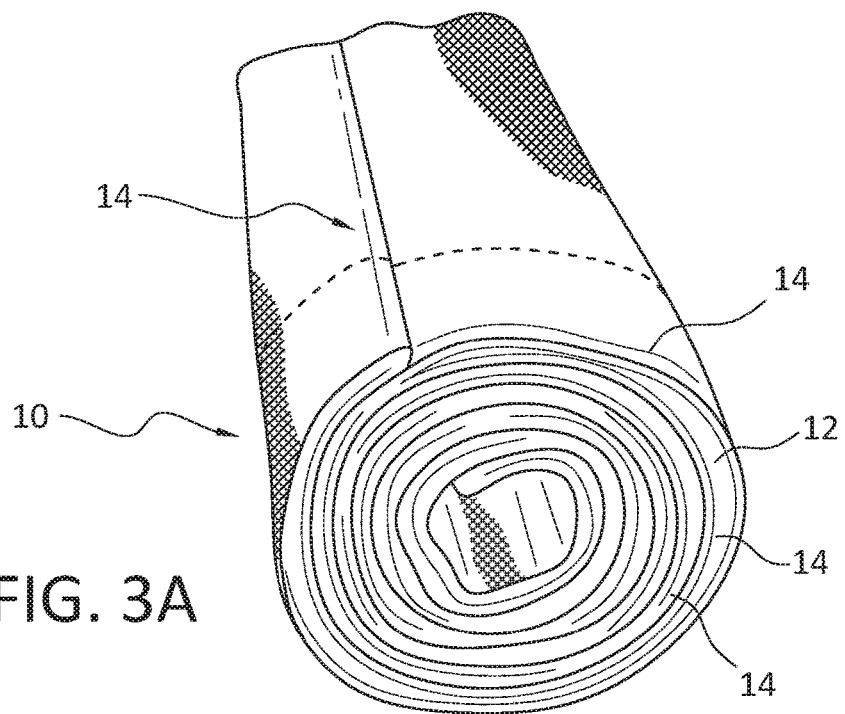
Figure 2B:
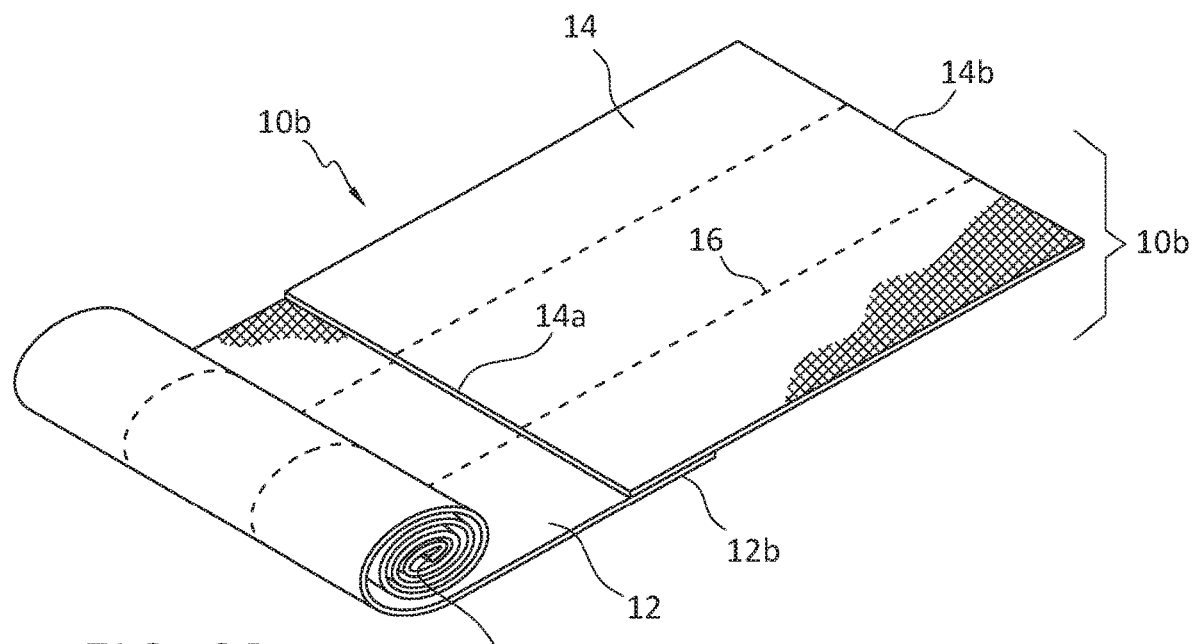
Figure 3B:
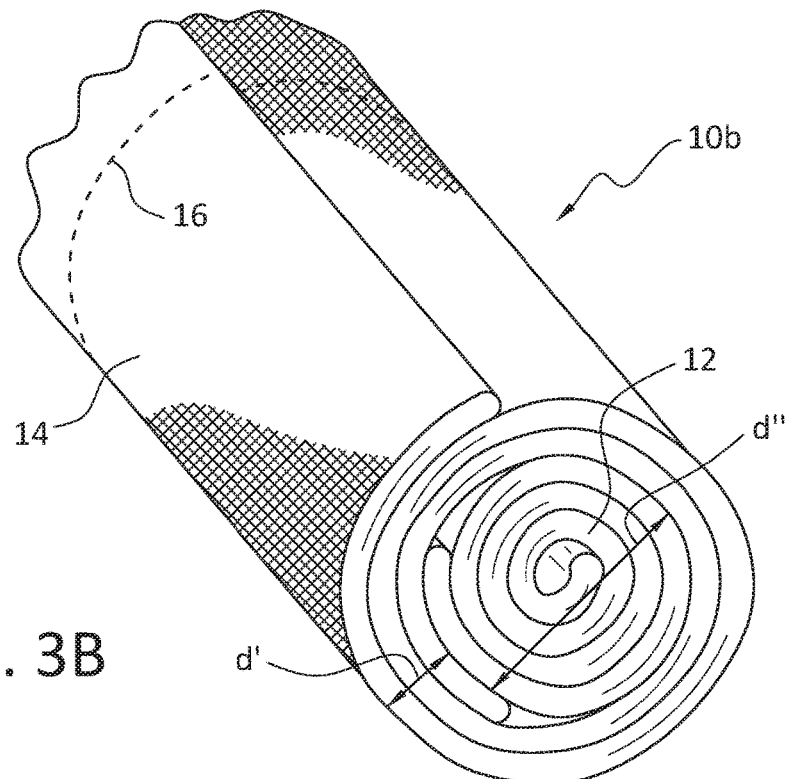
Figure 6:
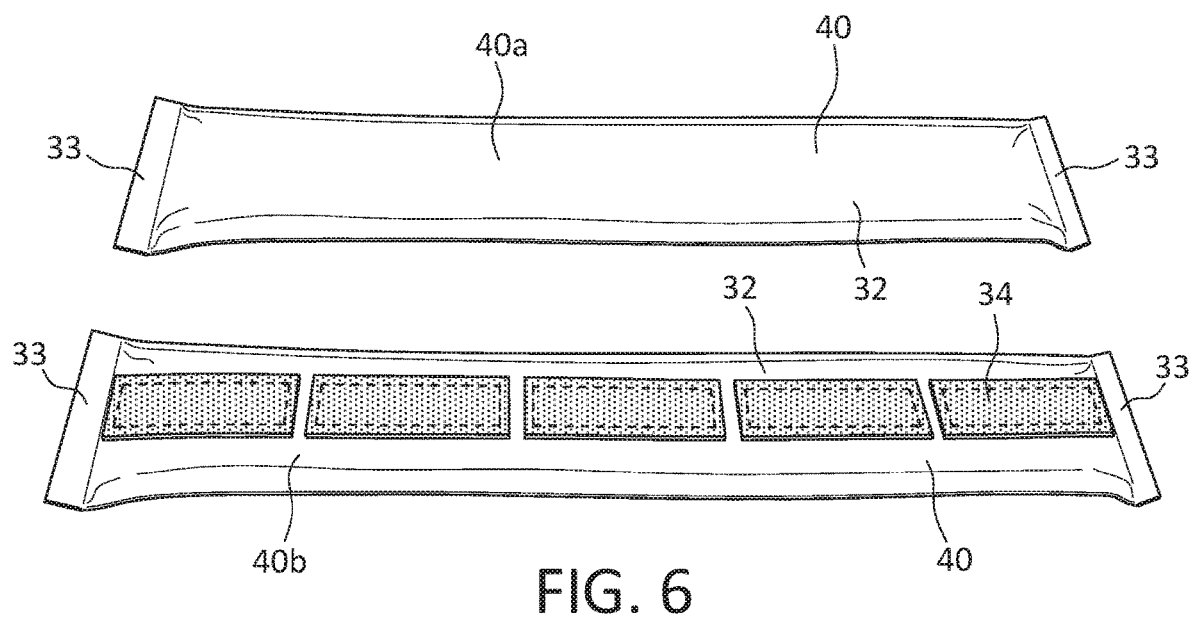
Figure 7:
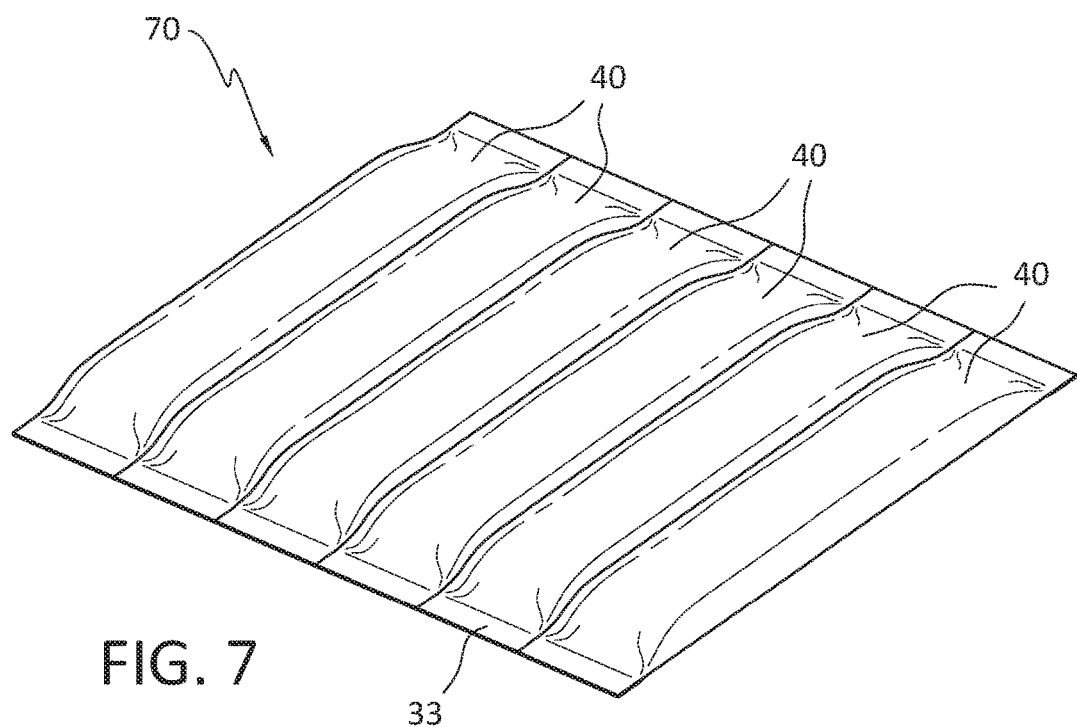
Figure 8:
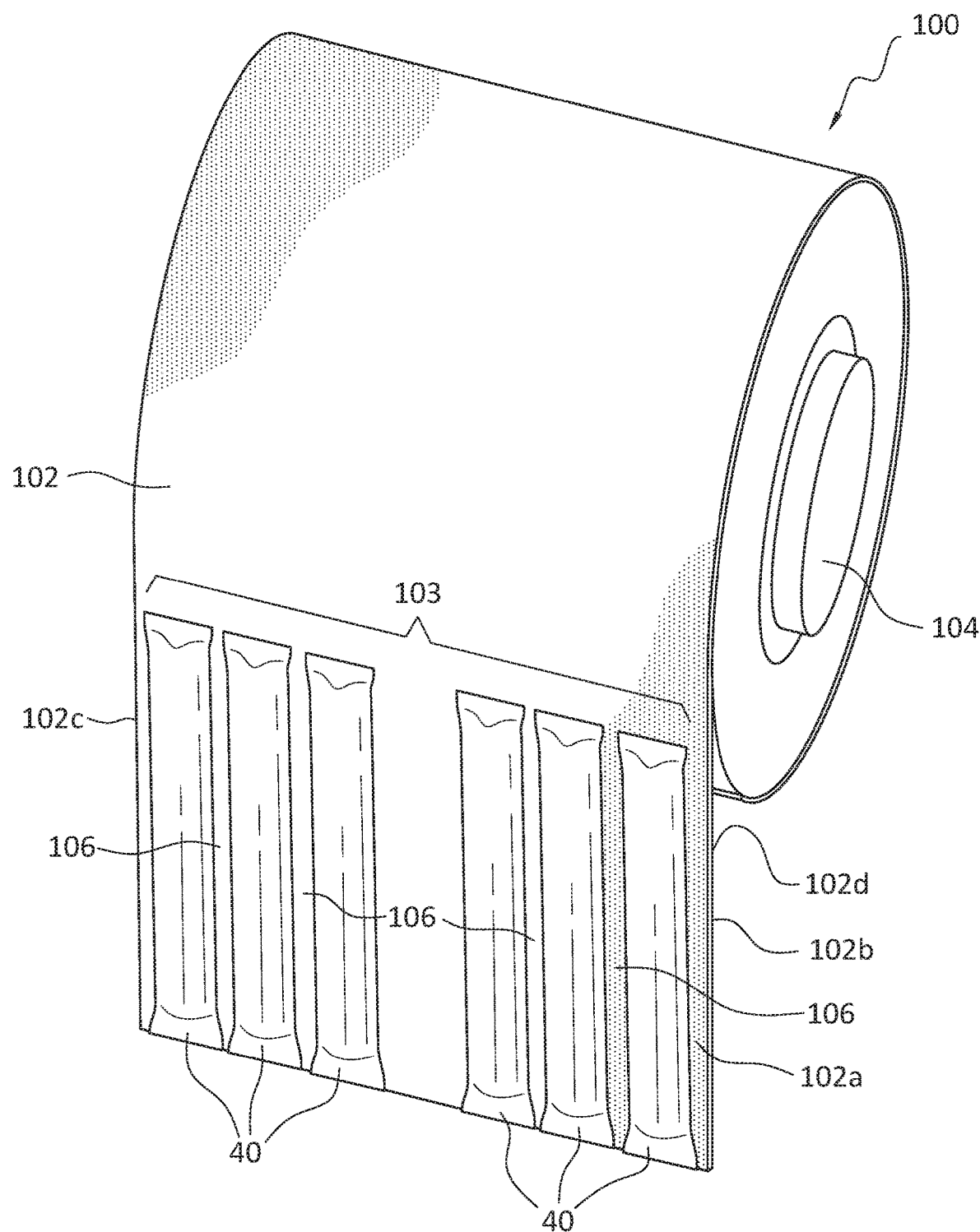
Figure 9:
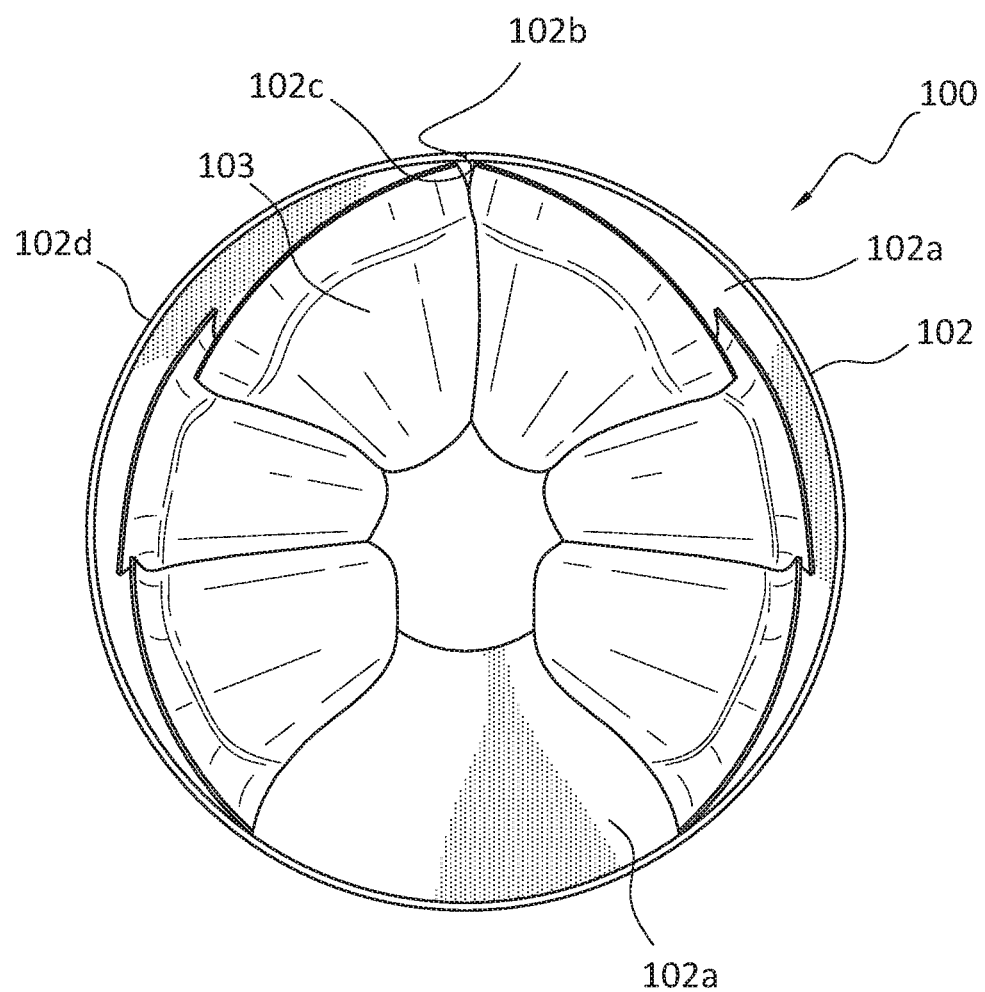
Figure 10:
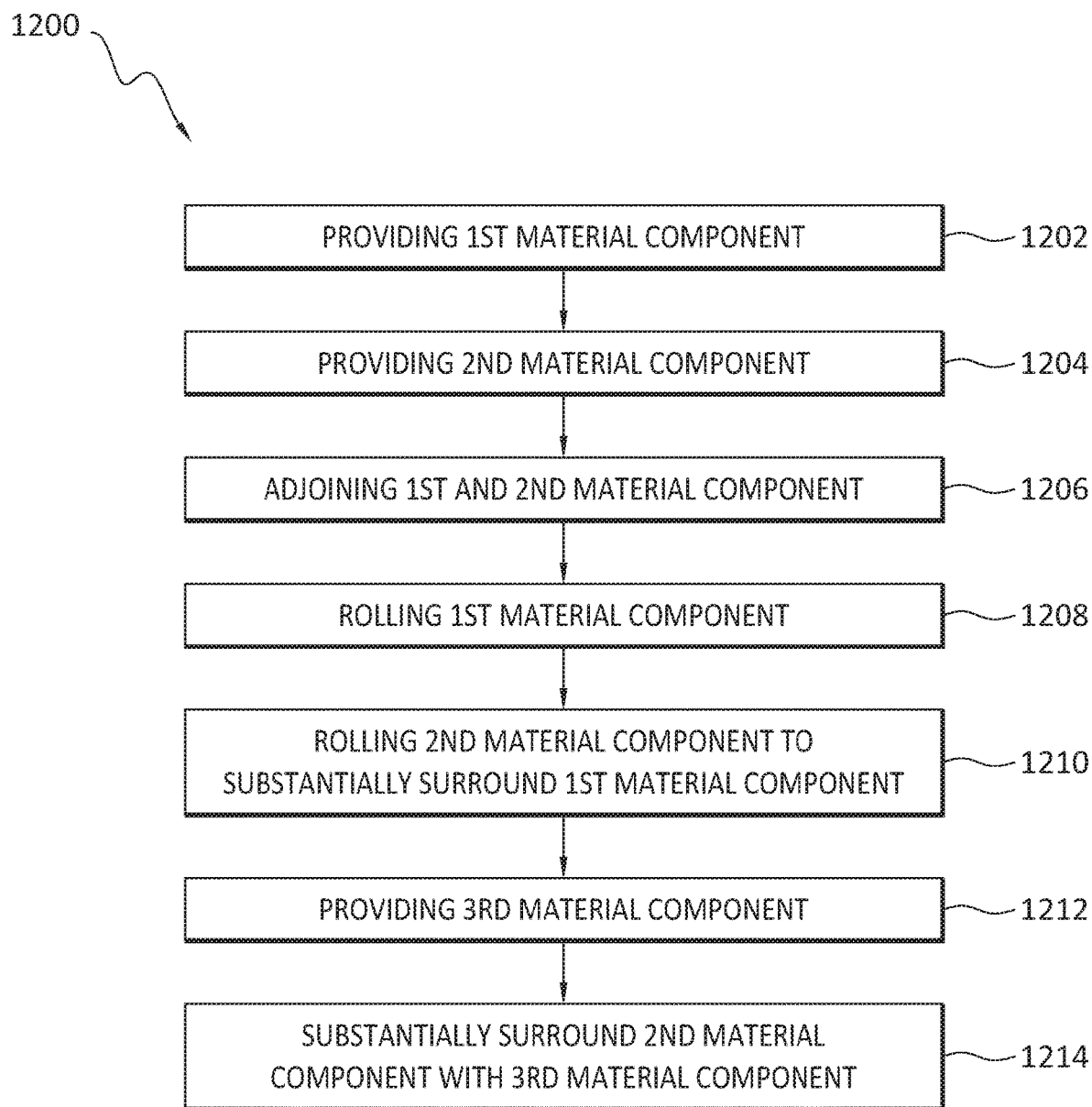
Figure 11:
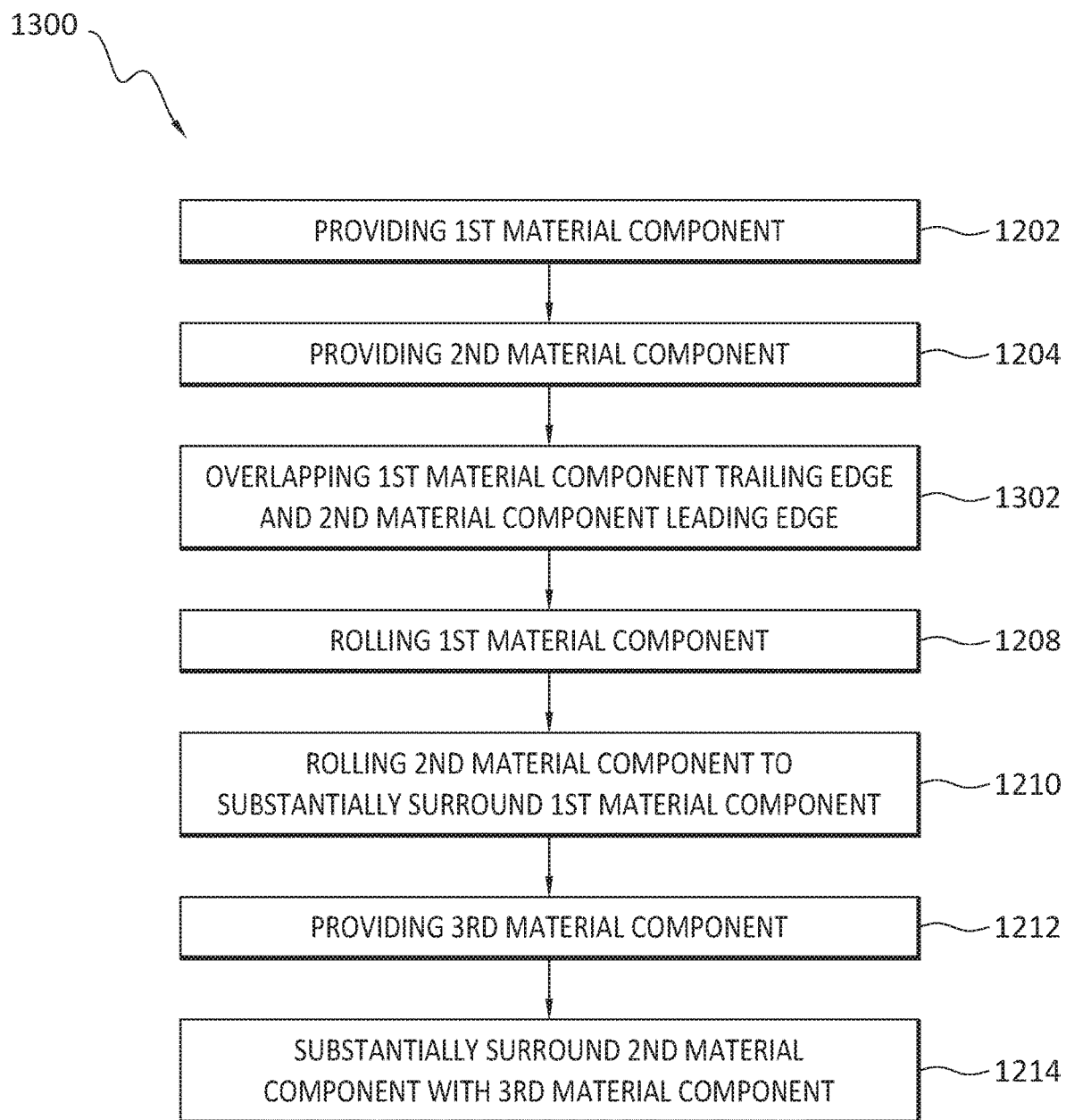
Figure 12:
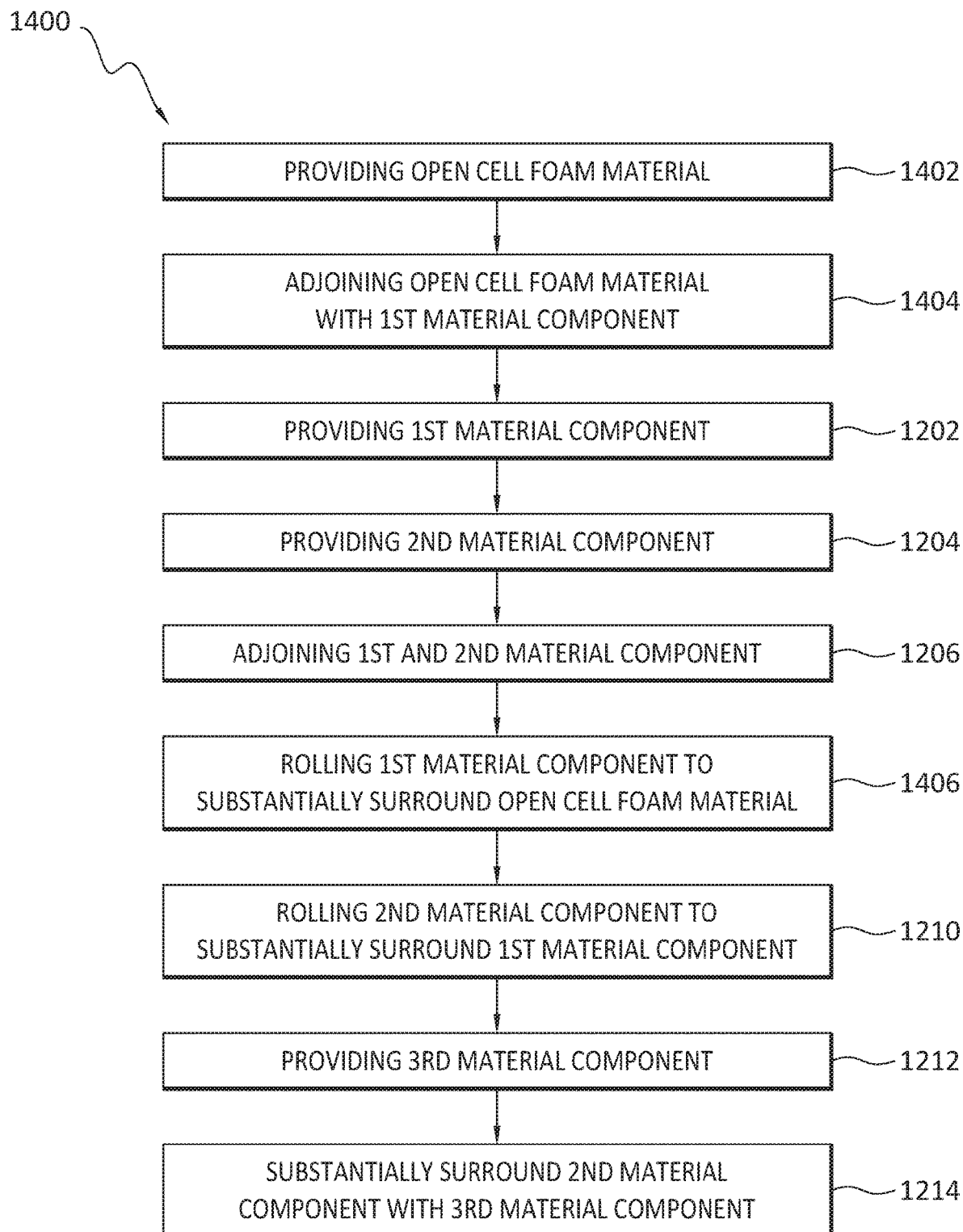
Figure 13:
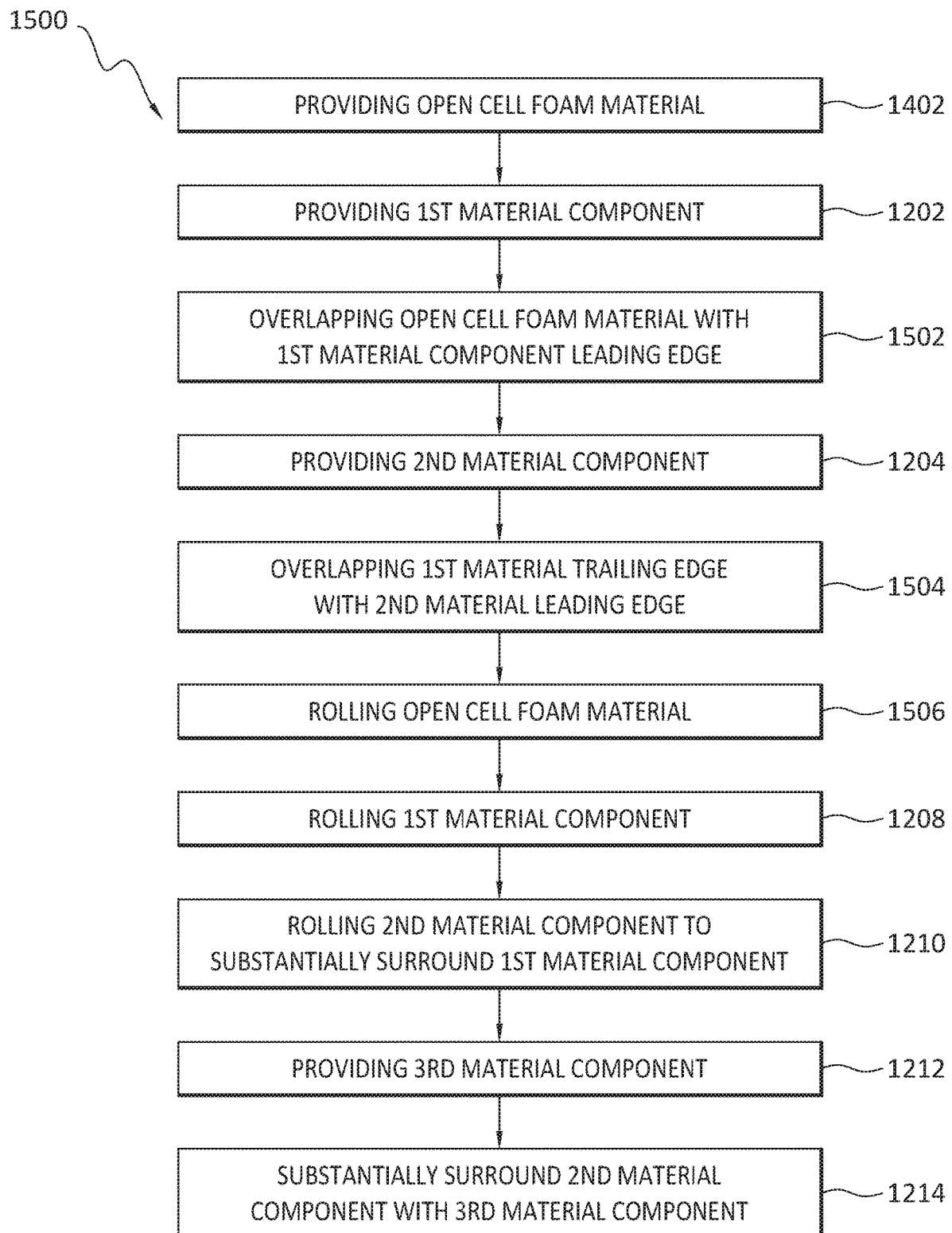
Figure 14:
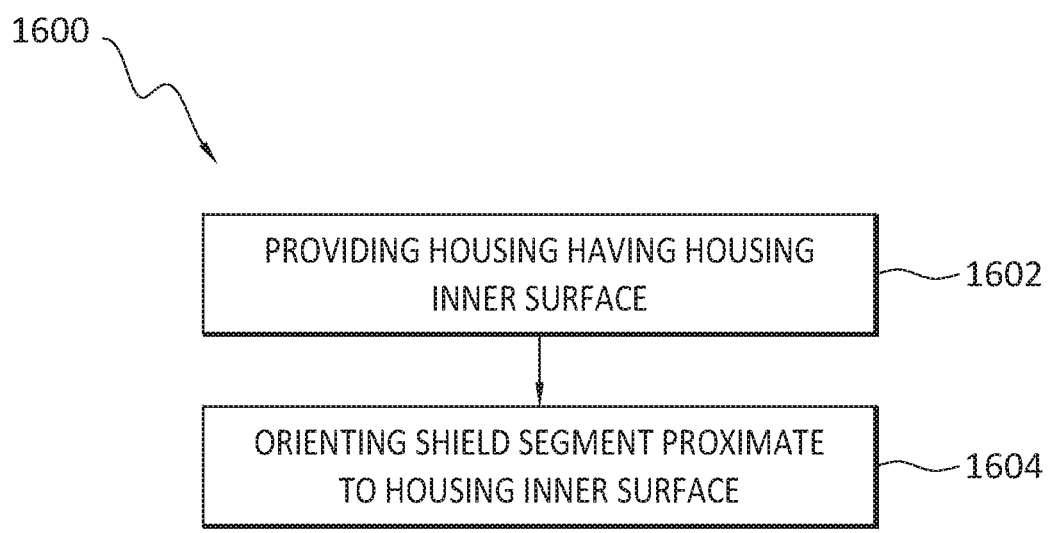

Having thus described variations of the disclosure in general terms, reference will now be made to the accompanying drawings, which are not necessarily drawn to scale, and wherein:

FIG. 1A is a non-limiting illustration of a perspective view of components combined to make a presently disclosed shield segment precursor according to present aspects;

FIG. 1B is a non-limiting cross-sectional view of the shield segment precursor shown in FIG. 1A, and according to present aspects;

FIG. 1C is a non-limiting illustration of a perspective view of components combined to make a presently disclosed shield segment precursor according to alternative present aspects;

FIG. 1D is a non-limiting cross-sectional view of the shield segment precursor shown in FIG. 1C, and according to present aspects;

FIG. 1E is a non-limiting illustration of a perspective view of shield components combined to make a presently disclosed shield segment precursor according to alternative present aspects;

FIG. 1F is a non-limiting cross-sectional view of the shield segment precursor shown in FIG. 1E, and according to present aspects;

FIG. 1G is a non-limiting illustration of a perspective view of shield components combined to make a presently disclosed shield segment precursor according to alternative present aspects;

FIG. 1H is a non-limiting cross-sectional view of the shield segment precursor shown in FIG. 1G, and according to present aspects;

FIG. 2A is a non-limiting perspective view of a shield precursor of the type shown in FIGS. 1A, 1B, 1C, 1D manufactured according to present aspects;

FIG. 2B is a non-limiting perspective view of a shield segment precursor of the type shown in FIGS. 1E and 1F manufactured according to present aspects;

FIG. 2C is a non-limiting perspective view of a shield segment precursor of the type shown in FIGS. 1G and 1H manufactured according to present aspects;

FIG. 3A is a non-limiting end view of a shield segment precursor of the type shown in FIG. 2A, and according to present aspects;

FIG. 3B is a non-limiting end view of a shield segment precursor of the type shown in FIG. 2B, and according to present aspects;

FIG. 3C is a non-limiting end view of a shield segment precursor of the type shown in FIG. 2C, and according to present aspects;

FIG. 4A is a non-limiting view of a shield segment including the shield segment precursor shown in FIG. 2A and FIG. 3A introduced into a protective sleeve and according to present aspects;

FIG. 4B is a non-limiting view of a shield segment including the shield segment precursor shown in FIG. 2B and FIG. 3B introduced into a protective sleeve according to present aspects;

FIG. 4C is a non-limiting view of a shield segment including the shield segment precursor shown in FIG. 2C and FIG. 3C introduced into a protective sleeve according to present aspects;

FIG. 5A is a non-limiting end view of a shield segment shown including the shield segment precursor of the type shown in FIGS. 2A, 3A, and 4A, according to present aspects;

FIG. 5B is a non-limiting end view of a shield segment including the shield segment precursor as shown in FIGS. 2B, 3B, and 4B, according to present aspects;

FIG. 5C is a non-limiting end view of a shield segment including the shield segment precursor as shown in FIGS. 2C, 3C, and 4C, according to present aspects;

FIG. 6 shows non-limiting illustrations of front and back sides of a shield segment according to present aspects;

FIG. 7 is a non-limiting perspective view of a plurality of shield segments oriented proximate to one another according to present aspects;

FIG. 8 is non-limiting a perspective view of a flexible housing for a boom according to present aspects;

FIG. 9 is a non-limiting end view of the housing shown in FIG. 10 in a deployed configuration with the flexible housing shaped into a cylinder according to present aspects;

FIG. 10 is a non-limiting flowchart outlining a method according to present aspects;

FIG. 11 is a non-limiting flowchart outlining a method according to present aspects;

FIG. 12 is a non-limiting flowchart outlining a method according to present aspects;

FIG. 13 is a non-limiting flowchart outlining a method according to present aspects; and FIG. 14 is a non-limiting flowchart outlining a method according to present aspects.

DETAILED DESCRIPTION

Typical micro-meteoroid shields and orbital debris shields for parts, assemblies, sub-assemblies, etc. (collectively referred to herein as "parts") on space vehicles or satellites include one or more rigid metallic shield structures or a conformal soft good blanket in concert with a rigid metallic shield structure. When components require protection from micro-meteoroids or orbital debris, especially including structures that involve single or multiple, repeated deployment cycles, for example, from a folded state or stowed state into a deployed or unfolded state (and back again, etc.), especially in space, shielding choices do not easily allow or otherwise permit, the use of rigid protective shielding structures.

According to present aspects, the protective shields disclosed herein, according to present aspects, can be segmented, and a plurality of the shield segments can be combined to form a segmented shield. Further, the shield segment includes predetermined combinations of layers of thin, light-weight, penetration-resistant materials that have now been found to provide, in specified combinations and specified orientations with one another, improved protection of structures associated with the shields, against through-and-through penetration of such structures by, for example, high-velocity micro-meteoroids and high-velocity orbital debris. The presently disclosed shield segments can be constructed and implemented as protective segmented shield structures in arrays that are typically folded or segmented into complex orientations, and to facilitate storage of such arrays in a stored or stowed state, and arrays that can be unfolded, or otherwise expanded from a stowed state into an unfolded or deployed state. In other words, the presently disclosed segmented shields, according to present aspects, can be themselves segmented, or the shields can be constructed to facilitate the implementation of the shields into a structure (e.g., an array, etc.) that can be segmented and folded into a stowed state and unfolded from a stowed state into a deployed state, etc.

For present application purposes, contemplated orbital debris can include particles in space having an average diameter ranging, for example, from about 1 mm to about 10 mm. Orbital debris can include man-made or human generated debris, detritus or other particulate matter (e.g. other man-made particles, non-naturally-occurring particles, etc.) in space that can achieve velocities ranging, for example, from about 1 km/sec. up to about 15 km/sec. For purposes of the present application the terms "orbital debris" and "orbital debris particles" are equivalent terms used interchangeably.

Micro-meteoroids are understood to be high-velocity particles that are naturally-occurring in space, that can orbit the sun, and that can achieve velocities in space ranging, for example, from about 1 km/sec. up to about 70 km/sec. For purposes of the present application, the terms "micro-meteoroids" and "micro-meteoroid particles" are equivalent terms used interchangeably. In addition, for present purposes the term "impacting particles" connotes micro-meteoroids and/or orbital debris that impacts a structure, for example, a structure (that can be a shielding structure, or a structure incorporating a shielding structure) in space.

The shields disclosed herein and according to present aspects inhibit through-and-through penetration of structure walls incorporating such shields when orbital debris particles and micro-meteoroid particles of at least a stated size (e.g., from about 1 mm to 3 mm average diameter, or more, etc.) are traveling at high velocities, including impacting particles having velocities (e.g. impact velocities) ranging from about 1 to about 15 kilometers per second (km/sec.) and from about 1 to about 70 km/sec., respectively. Present aspects further contemplate that the presently disclosed shields can effectively protect structures against through-and-through penetration of particles that may be significantly larger than about 3 mm.

According to present aspects, the presently disclosed light-weight, fiber-containing protective segmented shields, and apparatuses that incorporate the disclosed light-weight, fiber-containing segmented shields, provide robust and significantly improved levels of damage protection to components associated with the shields that have not been accomplished in the past, at least with respect to through-and-through penetration of high-velocity impacting particles. Present aspects further include methods of making and installing the segmented shields, and methods of protecting structures from through-and-through high-velocity particle penetration.

The presently disclosed light-weight, fiber-containing protective segmented shields, according to present aspects, are useful in the protection of thin walled, light-weight structural components; including thin-walled, light-weight structural or support components that can be folded or that otherwise progress from a compacted (e.g., folded, etc.) stowed state to an expanded (e.g., unfolded, etc.) deployed state, where rigid shielding is impractical or impossible. In addition, the presently disclosed fiber-containing protective segmented shields possess an overall predetermined weight that is desirable for component and overall structure payload considerations (e.g., including space mission considerations, etc.).

According to present aspects, the light-weight, fiber-containing protective segmented shields include at least two different materials types used in specified combinations to provide a first material component and a second material component, with the first and second material components including a predetermined number of layers. The predetermined combination of different material types for the first material component and second material component affords heightened levels and tunable levels of protective shield performance, as the first material component and second material component material "types" can be selected such that, in combination, the presently disclosed multi-layered protective segmented shields are customized to predetermined standards and dimensioned to facilitate the positioning of the presently disclosed segmented shields within, for example, a deployable and stowable housing of a structure to be protected.

The order, amount, and orientation of the first material component and second material component relative to one another within the presently disclosed light-weight, fiber-containing protective segmented shield is preselected, such that the shields are constructed to confront and withstand a high-velocity particle of a specified average diameter that has pierced (e.g., penetrated, etc.) an entry location of a thin-walled housing that contains the shields, and also inhibit such invading particles from passing through a second (e.g. an exit) location of the housing (referred to herein as "though-and-through" penetration).

The penetration of a high-velocity particle through a thin-walled housing (e.g., a thin-walled housing of a support used in connection with an arm or boom in space, etc.) may be an undesirable but accepted occurrence, as high-velocity particles that breach a first location of a thin-walled barrier (e.g., a housing, etc.) are understood to create a first barrier breach having a first specified diameter. At impact with the barrier (e.g., a housing wall, etc.), the particle enters the barrier at a barrier entry breach and passes through the barrier entry breach and into the structure. The particle impact with the barrier can cause the particle to rupture or fragment. Typically, the rupturing or fragmenting of the particle upon impact with the barrier can cause an exit breach in the barrier (e.g., a single or multi-walled housing, etc.) that has a much greater diameter than the diameter of the barrier entry breach. Such particle passage from an entry breach into a structure and then out through an exit breach is referred to equivalently herein as a "through-and-through passage" or "through-and-through-pathway", or "through-and-through breach", or "through-and-through penetration", and the terms are used equivalently and interchangeably herein.

According to present aspects, the housing of structures that include the presently disclosed segmented shields encounters an initial impact of high-velocity particles, with the particles potentially breaching a housing at a housing or barrier entry point. As the invading particles pass through the housing and enter the structure, the particles then encounter the presently disclosed segmented shields. The now fragmented particles impact the segmented shields and are absorbed by the shields, with the particles thereby inhibited from passing out of the segmented shield, or at least out of the housing at any housing exit point.

Upon impact with the housing entry point, the fragmented high-velocity particles are impeded from passing through (e.g. exiting) a housing wall, by impacting the presently disclosed shields, and by preferably impacting multiple areas of the light-weight, fiber-containing protective segmented shields that are multi-layered and that comprise the predetermined combination of different material types, and different material orientations with respect to one another, and with the selected material types comprising a predetermined number of layers. The term "impeding from passing through" connotes that the velocities of the particles are substantially reduced (and hence impeded) to a velocity that the shield itself can absorb or reduced to a velocity that the housing itself could withstand, such that the particles no longer possess the energy and velocity to again pierce the housing and otherwise exit the housing.

According to further present aspects, the presently disclosed shields are light-weight, fiber-containing protective segmented shields that possess a predetermined collective flexibility to allow for their folding, compressing, or other dimensional shaping, or geometric shaping, etc. Further, the presently disclosed shields can be manufactured into continuous or discrete segments with the segments having predetermined dimensions and configurations, including predetermined configurations and dimensions that facilitate their use as shields in connection with foldable or segmented arrays (e.g., arrays that include foldable or segmented housings, etc.).

According to present aspects, the contemplated light-weight, fiber-containing protective segmented shields can be considered to be hetero-structures, with the hetero-structures comprising multiple layers of different material types that can be formed or otherwise manipulated, etc., into, for example a substantially cylindrical lengthwise orientation, or "roll" of a predetermined length, width and thickness. According to other aspects, the contemplated light-weight, fiber-containing protective segmented shields including multiple layers of different material types can be formed or otherwise manipulated, etc., into, for example, a stacked orientation that may or may not be substantially cylindrical, or manufactured into a predetermined length, width and thickness that can be a rolled configuration.

Further present aspects contemplate a first material component including a first fiber material having a tensile strength of at least about 3620 MPa and a relative density of about 1.44. Such a representative first fiber material can include a ballistic performance fabric material that can include, for example aramid fibers, and that can include, for example, poly-paraphenylene terephthalamide (e.g., sold commercially as Kevlar®, DuPont).

Present aspects contemplate aligning, or "stacking", a predetermined number (e.g., a number of layers ranging from about 3 to about 5 layers) of poly-paraphenylene terephthalamide layers that can then be, according to present aspect, manipulated or otherwise formed into a rolled configuration by rolling the first fiber material layers upon itself to form a first material component having a predetermined thickness, for example of about 70 layers of first material component thickness across its diameter to make the presently disclosed shields.

The presently disclosed light-weight, fiber-containing protective segmented shields comprise a second material component that includes a second fiber material that is different from the first fiber material used to form the first material component, with the second fiber material comprising a ceramic fiber material that can be an aluminum oxide fiber material. According to further present aspects, the second fiber material can be a continuous filament aluminum oxide material (e.g., sold commercially as Nextel™, 3M Company), with Nextel™ 312, being one preferred material.

The second fiber material has a high heat dispersivity value and is considered to be, and as referred to herein, a "high temperature fiber" that is able to withstand temperatures during continuous use up to about 2192° F. (1200° C.), for example, maintain a 40% fiber strength retention after 100 hours such temperatures, and have a melting point of as high as about 3272° F. (1800° C.). According to further present aspects, the second fiber material is a continuous filament aluminum oxide material that is dimensionally stable; and having a low elongation and low shrinkage at operating temperatures up to at least about 2000° F., as well as low thermal conductivity ranging from about range between 0.1 and 0.2 watt per meter Kelvin (W/m-K) at temperatures below 900° C. degrees Celsius; a low porosity ranging from about 20 to about 70 cubic feet per minute per square foot (cfm/ft$^2$).

As shown in the FIGs, and as described in more detail herein, present aspects disclose substantially surrounding or "wrapping" a second material component about (e.g., "around") the first material component. According to present aspects, the first fiber material of the first material component can be "stacked up" to, for example, align with a predetermined number of second material component layers such as, for example 2 to 3 layers of second fiber material of the second material component that is a material that is different from the first fiber material (e.g., having different predetermined characteristics, etc.). The second material component is then manipulated or otherwise formed into a rolled configuration by rolling the second material component upon the first material component to form a second material component having a predetermined second material component thickness (e.g., a second material component thickness ranging from about of about 8 to about 12 layers thick) that covers or otherwise substantially surrounds the first material component thickness.

In total, the first material component covered by the second material component can be said to form a shield segment "precursor" having a total number of first material component (about 70 layers) and second material component (about 8 to about 12 layers thick), with the shield segment "precursor" totaling about 80 layers of total thickness, measured in terms of the roll diameter. In further aspects, the first fiber material and/or second fiber material can be prepared to include the desired and predetermined number of layers and then placed in sheets or rolls, awaiting use as the light-weight, fiber-containing protective shield segment precursors.

According to further aspects, the second material component of the shield segment precursor can be substantially surrounded or "wrapped" by a third material component to form the completed "shield segment" (referred to equivalently herein as the "shield pillow"). The third material can be one or more layers thick, with the third material component including a silica fiber cloth such as, for example, a material known as Beta cloth. Beta cloth is understood to include woven silica fiber cloth that will not burn. In addition, to increase material stability, the silica fibers of Beta cloth can be coated with, for example, polytetratluoroethylene (PTFE) to increase durability and flexibility of the resulting fiber cloth and otherwise resist creasing or tearing, while improving the overall handling, manipulating, installing, reworking, removal etc. of the shield segment. A representative third material component is Beta cloth (i.e., Teflon-coated fiberglass cloth), sold as a finished product as, for example, part number BA 500BC—(Bron Aerotech, Denver, Colo.).

While the shield segment precursors, shield segments, and the finished segmented shields of the present disclosure can be manufactured in many ways, FIGS. 1A and 1B illustrate aspects of the present disclosure. FIG. 1A shows a non-limiting illustration showing a process of manufacturing a shield segment precursor according to a present aspect. As shown in FIG. 1A, a second material component 14 comprising a predetermined number of layers is oriented to receive a first material component 12, with the first material component 12 also comprising a predetermined number of layers. The first and second material components are brought proximate to one another and substantially overlap to form a shield segment precursor 10 in a sheet-like, and substantially planar, form. First and second material components are shown with markings 16 included thereon indicating where, if desired the first and second material components are stitched or otherwise affixed together.

FIG. 1B is a cross-sectional view of the shield segment precursor 10 formed in FIG. 1A, with shield segment precursor 10 showing the first material component 12 oriented proximate to the second material component 14. Stitching 18 is shown occurring through the thickness of shield segment precursor 10, with the stitching 18 occurring approximately at the markings 16 as shown in FIG. 1A. According to the present application, the terms "proximate" and "adjacent" are used equivalently and interchangeably.

As shown in FIGS. 1A and 1B, and according to certain present aspects, the stitching 18 is understood to stitch together layers of the first material in the first material component 12, and to stitch layers together layers of the second material in the second material component 14. The first and second material components 12, 14, respectively, can then be stitched together making a lap seam that joined the two material components together.

According to an alternative aspect, a layer of low density open cell foam material can be added to the "stack" that will form a shield precursor in a sheet-like, and substantially planar, form. FIGS. 1C and 1D are non-limiting illustrations of this alternative aspect where a layer of open cell foam 13 is added to the shield to form shield segment precursor 10a comprising such layer of open cell foam 13. As shown in FIG. 1C, a second material component 14 comprising a predetermined number of layers is oriented to receive a first material component 12, with the first material component 12 also comprising a predetermined number of layers. The first and second material components are brought proximate to one another and substantially overlap one another to form shield segment precursor 10a in a sheet-like, and substantially planar, form. As further shown in FIG. 1C, an open cell foam material 13 is oriented proximate to the first material component 12, First and second material components are shown with markings 16 included thereon indicating where, for example, if desired the first and second material components are stitched or otherwise affixed together and/or where individual layers of each material type can be joined together. Optionally, the open cell foam material 13 may be attached to the first and second material components (12, 14, respectively).

FIG. 1D is a cross-sectional view of the shield segment precursor 10a formed in FIG. 1C, with shield segment precursor 10a showing the open cell foam material 13 oriented proximate to the first material component, and the first material component 12 oriented proximate to the second material component 14. Stitching 18 is shown occurring through the thickness of shield segment precursor 10a, with the stitching 18 occurring approximately at the markings 16 as shown in FIG. 1C.

The open cell foam can be selected with weight constraints in mind such that the open cell foam material 13 can be a low-density open cell foam polyethylene based foam or a polyimide foam such as that sold commercially as SOLIMIDE® (Boyd Corp., Pleasanton, Calif.). Further, while the open cell foam material 13 is shown in the FIGs as a sheet-like material, present aspects further contemplate the open cell foam material 13 being provided as a "block" of material having a predetermined length, width, and height, with the open cell foam block being regularly or irregularly shaped and dimensioned along its length.

FIGS. 2A, 3A, 4A, and 5A relate to FIGS. 1A, 1B, 1C, and 1D in that, according to present aspects, although not easily perceived, the component layers substantially cover one another to form a shield segment precursor 10 or 10a that is multi-layered and is a multi-component shield. In this configuration, as the multi-layered shield segment precursor 10 is rolled, the first material component 12 and second material component 14 will repeatedly "alternate in their occurrence", as would be visible in a cross-sectional bisection of the roll. When the open cell foam material 13 is included, a shield segment precursor 10a (as shown in FIGS. 1C and 1D, but not shown in a rolled configuration) will have a cross section that includes alternating first, second, and third material components 12, 14, and 13, respectively, in layers of shield segment precursor 10a in the rolled configuration.

FIG. 2A is a representative view of the shield segment precursor 10 comprising first and second material components as shown in FIGS. 1A and 1B. As shown in FIG. 2A, the shield segment precursor 10 in its sheet like and substantially planar form can be rolled upon itself to create a shield in, for example, a "rolled" orientation. According to present aspects, the properties of the second material component may be more desirable for an outer layer, requiring the shield segment precursor 10 in sheet-like form to be "rolled" such that the second material component 14 is presented as the "outer layer" of the shield segment precursor 10 in the rolled orientation that can be cylindrical.

The term "substantially cylindrical shield" connotes a cylindrical orientation that includes a substantially cylindrical orientation that may not have a perfectly constant diameter along its length to be perfectly cylindrical, or that may have more than 1 focus point (e.g., two foci, as would an ellipse have) For purposes of this application a tubular structure that is oval, elliptical, or cylindrical can be considered, according to present aspects, to be substantially cylindrical. Therefore, as used herein, the terms "substantially cylindrical shield" and "cylindrical shield" are equivalent terms and are used interchangeably.

FIG. 3A is an end view of the shield segment precursor 10 that is shown being formed in FIG. 2A. As shown in FIG. 3A, shield segment precursor 10 shows the second material component 14 occurring on the exterior of the shield segment precursor 10 now in a cylindrical orientation. While first material component 12 and second material component 14 layers will alternate due to the rolling process, when the shield segment precursor 10 is in its cylindrical orientation as show in FIG. 3A, second material component 14 is shown oriented as the outermost layer. That is, the entirety of the outer surface of shield segment precursor 10 in a cylindrical orientation is "covered" by layers of second material component 14 such that no amount of the first material component 12 is exposed to the external or outer surface of the shield segment precursor 10 in its rolled configuration. Though not shown in FIG. 2A or 3A, the shield precursor 10a shown in FIGS. 1C and 1D can be configured into the rolled orientation as shown in FIGS. 2A and 3A.

According to present aspects, shield segment precursor 10 further includes a third material component 32 that becomes an outer covering for the shield segment precursor 10 in its cylindrical orientation. FIG. 4A is an illustration of shield segment precursor 10 being inserted into a third material component 32 in the form of, for example, a "sleeve" that is dimensioned to receive shield segment precursor 10 in the cylindrical orientation. The shield segment precursor 10 oriented within the third material component forms the shield segment 30a. As shown in FIG. 4A, the outer surface of third material component can include a fastener 34 configured to secure the shield pillow to a surface. Aspects of the present disclosure contemplate the presence of a plurality, or predetermined number of fasteners 34 positioned on the exterior of the third material component 32, with the third material component 32 shown in FIG. 4A as a "sleeve" dimensioned to receive the shield segment precursor 10a in a cylindrical orientation. Aspects of the present disclosure further contemplate that fastener 34 can allow the shield segment 30a to be adjustably located and fixed on a surface, or that can further allow the shield segment 30a to be removed from or reattached to a surface without damaging the shield segment 30a or a surface to which the shield segment 30a is otherwise removably or fixedly attached or otherwise secured. That is, the fastener 34 can be configured to be reusable, or to otherwise secure the shield segment 30a in a fixed or quasi-fixed location, and that can be adjusted in a predetermined fashion.

FIG. 5A is a longitudinal end view into the shield segment 30a shown as being formed in FIG. 4A. As shown in FIG. 5A, shield segment 30 includes the shield segment precursor 10 in rolled orientation (e.g., rolled form) within the third material component 32 encasing the shield segment precursor 10. Shield segment precursor 10 further includes the second material component 14 as the outermost layer that covers first material component 12 substantially completely. Though not shown in FIG. 4A or 5A, the shield precursor 10a, shown in FIGS. 1C and 1D can be configured into the rolled orientation as shown in FIGS. 4A and 5A.

While bound to no particular theory, it is believed that heightened shield performance can be obtained by orienting the dissimilar materials in such a way that the different material components are condensed or otherwise concentrated within the shield segment precursor and shield segment configuration, with a greater condensed thickness of second material component covering a greater condensed thickness of first material component as compared to the aspects described above and shown in FIGS. 1A, 1B, 1C, 1D, 2A, 3A, 4A and 5A.

That is, FIGS. 1E and 1F show alternate present aspects (and relate to aspects shown in FIGS. 2B, 3B, 4B, and 5B. FIGS. 1E and 1F show a second material component 14 comprising a predetermined number of layers is oriented to receive a first material component 12 at an edge that can be a leading edge or a trailing edge, with the first material component 12 also comprising a predetermined number of layers. The first and second material components (12, 14, respectively) are brought proximate to one another to form shield segment precursor 10b in a sheet-like, and substantially planar, form. As shown in FIGS. 1E and 1F, first material component 12 does not overlap second material component 14 substantially completely, as shown in FIGS. 1A and 1B. Instead, first material component 12 overlaps second material component 14 to a predetermined distance that can be, for example from about 0.5 to about 2 inches of overlap.

As shown in FIGS. 1E and 1F (and FIG. 2B), and according to certain present aspects, first and second material components 12, 14 respectively, are shown with markings 16 included thereon indicating where, for example, if desired, the first and second material components are stitched or otherwise affixed together and/or where individual layers of differing material types can be joined together. The first and second material components 12, 14 can then be stitched together making, for example, a lap seam that joins the two material components together to form shield segment precursor 10b. As shown in FIGS. 1E and 1F, first material component 12 has a first material component leading edge 12a and a first material component trailing edge 12b. Further, second material component 14 is shown having a second material component leading edge 14a (that overlaps first material component material trailing edge 12b) and a second material component trailing edge 14b.

FIG. 2B is a representative view of the shield segment precursor 10b comprising first and second material components as shown in FIGS. 1A and 1B. As shown in FIG. 2B, the shield segment precursor 10b in its sheet like and substantially planar form can be rolled upon itself to create a cylindrical shield segment precursor 10b in, for example, a "rolled" orientation. FIG. 2B shows the shield segment precursor 10b being formed into a substantially "rolled" orientation. According to present aspects, the properties of the second material component 14 are pre-selected be more desirable for an outer shield layer, requiring the shield segment precursor 10b in sheet-like form to be "rolled" such that the second material component 14 is presented as the "outer layer" of the shield segment precursor 10b in the rolled an cylindrical orientation. The term "cylindrical" connotes a cylindrical orientation that may not have a perfectly constant diameter along its length to be perfectly cylindrical, and that is considered, according to present aspects, to be substantially cylindrical. Therefore, as used herein, the terms "substantially cylindrical shield" and "cylindrical shield" are equivalent terms and are used interchangeably.

FIG. 3B is an end view of the shield segment precursor 10b that is shown being formed in FIG. 2B with shield segment precursor 10b being multi-layered and a multi-component shield. As shown in FIGS. 3B and 5B, shield segment precursor 10b shows a second material component thickness (d') of the second material component 14 occurring on the exterior of the shield segment precursor 10b in cylindrical form, with first material component 12 shown in FIG. 3B and FIG. 5B as occupying a first material component thickness (d") oriented inside of the thickness, d', of the second material component thickness, d'. That is, the entirety of the outer surface of shield segment precursor 10b in cylindrical form includes a predetermined thickness, d' of second material component 14 such that no amount of the first material component 12 is exposed to the external or outer surface of shield segment precursor 10b in a cylindrical configuration. As shown in FIG. 3B, the innermost area of the rolled shield can incorporate an inner core that can include a space having a predetermined diameter, with the inner core "space" that can be devoid of any material bounded by the first material component.

According to present aspects, shield segment precursor 10b can further includes a third material component 32 that becomes an outer covering for the shield segment precursor 10b in cylindrical, or "roiled" form. FIG. 4B is an illustration of shield segment precursor 10b in cylindrical form and being inserted into a third material component 32 in the form of a sleeve that is dimensioned to receive cylindrical shield segment precursor 10b. The shield segment precursor 10b oriented within the third material component 32 forms the shield segment 30b (shown in FIG. 5B). As shown in FIG. 4B, the outer surface of third material component 32 can include a fastener 34 configured to secure the shield pillow to, for example, a surface that can be an inner housing surface.

Aspects of the present disclosure contemplate the presence of a plurality, or predetermined number of fasteners 34 positioned on the exterior of the third material component 32 that is shown in FIG. 4B as a "sleeve" dimensioned to receive the shield segment precursor 10b. Aspects of the present disclosure further contemplate that fastener 34 can allow the shield segment 30b to be adjustably located on a surface or can further allow the shield segment 30b to be removed from or reattached to a surface without damaging the shield pillow. That is, the fastener 34 can be configured to be reusable, or to otherwise secure the shield segment in a fixed or quasi-fixed location that can be adjusted in a predetermined fashion.

FIG. 5B is a longitudinal end view into the shield segment 30b shown as being formed in FIG. 4B. As shown in FIG. 5B, shield segment 30b includes the shield segment precursor 10b in cylindrical or "rolled" form, or rolled configuration, and shown positioned within the third material component 32, with the third material component 32 encasing the shield segment precursor 10b. Shield segment precursor 10b further includes the second material component 14 as the outermost layer with first material component 12 attached to the second material component 14.

While bound to no particular theory, it is believed that heightened shield performance can be obtained by orienting the dissimilar materials in such a way that the different material components are condensed or otherwise concentrated within the shield configuration, with a condensed thickness of second material component covering a condensed thickness of first material component (as shown in FIGS. 1E, 1F, 2B, 3B, 4B, and 5B) with the addition of a predetermined thickness of open cell foam material oriented as the core material within the aforementioned shields in the cylindrical configuration.

FIGS. 1G and 1H (and FIG. 2C) show a second material component 14 including a second material component leading edge 14a and a second material component trailing edge. FIGS. 1G and 1H further show a first material component 12 having a first material component leading edge 12a and a first material component trailing edge 12b. As also shown in FIGS. 1G and 1H, open cell foam material 13 includes open cell foam material leading edge 13a and open cell foam material trailing edge 13b. As shown, open cell foam material 13 adjoins first material component 12, and first material component 12 adjoins second material component 14. As shown in FIGS. 1G, 1H and 2C, open cell foam material trailing edge 13b overlaps first material component leading edge 12a, and first material component trailing edge 12b overlaps second material component leading edge 14a. The overlaps as shown are non-limiting and can represent a predetermined distance that can be, for example from about 0.5 to about 2 inches of overlap (as can be the case for material "overlaps" as shown in FIGS. 1E, 1F, and 2B). with a predetermined amount of open cell foam material 13 (e.g., having a predetermined thickness and/or a predetermined number of layers to form a predetermined thickness of open cell foam material). The first and second material components (12, 14, respectively) and the open cell foam material are brought proximate to one another to form shield segment precursor 10c in a sheet-like, and substantially planar, form.

As shown in FIGS. 1G and 1H, and according to certain present aspects, first and second material components are shown with markings 16 included thereon indicating where, for example, if desired, the first material component 12, second material component 14, and open cell foam material 13 can be stitched or otherwise affixed together and/or where individual layers of differing material component types can be joined together. For example, the first and second material components 12, 14, and open cell foam material 13 can then be stitched together making, for example, a lap seam that joins the two material components together to form shield segment precursor 10c.

FIG. 1H is a cross-sectional view of the shield segment precursor 10c formed in FIG. 1G, with shield segment precursor 10c showing the open cell foam material 13 oriented proximate to and at an edge of the first material component 12, and the first material component 12 oriented proximate to and at an edge of the second material component 14. Stitching 18 is shown occurring through the thickness of shield segment precursor 110c, with the stitching 18 occurring approximately at the markings 16 as shown in FIG. 1C.

FIG. 2C is a representative view of the shield segment precursor 10c shown in FIGS. 1G, 1H comprising first material component 12, second material component 14, and third material component 13 as shown in FIGS. 1G and 1H. As shown in FIG. 2C, the shield segment precursor 10c in its sheet like and substantially planar form can be rolled upon itself to create shield segment precursor 10c into a cylindrical, or "rolled" orientation or form. According to present aspects, the properties of the second material component 14 are pre-selected to form an outermost layer of shield segment precursor 10c. The term "cylindrical shield" connotes a cylindrical orientation that may not have a perfectly constant diameter along its length to be perfectly cylindrical, and that is considered, according to present aspects, to be substantially cylindrical. Therefore, as used herein, the terms "substantially cylindrical shield" and "cylindrical shield" are equivalent terms and are used interchangeably.

FIG. 3C is an end view of the shield segment precursor 10c shown in FIG. 2C in completed cylindrical form. As shown in FIG. 3C, shield segment precursor 10c shows a second material component thickness (d') of the second material component 14 occurring on the exterior of the shield segment precursor 10c in cylindrical form, with first material component 12 shown in FIG. 3C as occupying a first material component thickness (d") oriented inside of the thickness, d' of the second material component 14, and closer to the center of the shield segment precursor 10c. That is, the entirety of the outer surface of cylindrical shield segment precursor 10c includes a predetermined thickness, d', of second material component 14 such that no amount of the first material component 12 is exposed to the external or outer surface of shield segment precursor 10c in cylindrical, "rolled" form. In addition, FIG. 3C shows a predetermined open cell foam material thickness, d''', of open cell foam material 13 oriented in a rolled form and oriented as the innermost layer, or "core" of shield segment precursor 10c and proximate to the thickness (d") of first material component 12. Accordingly, first material component 12, as shown in FIGS. 3C (and 5C) appears having a thickness d" and is oriented in shield segment precursor 10c as an "intermediate" layer between second material component 14 and the open cell foam material 13 (the innermost material), with second material component being the "outermost" or exterior material. As shown in FIGS. 3C and 5C, the innermost area of the rolled shield can incorporate an inner core that can include a space having a predetermined diameter, with the inner core "space" (e.g., a space that can be devoid of any material) bounded by the open cell foam material.

According to present aspects, shield segment precursor 10c can further include a third material component 32 that becomes an outer covering for the shield segment precursor 10c in cylindrical, or "rolled" form. FIG. 4C is an illustration of shield segment precursor 10c in cylindrical form and being inserted into a third material component 32 in the form of a sleeve that is dimensioned to receive shield segment precursor 10c in cylindrical form. The shield segment precursor 10b oriented within the third material component 32 forms the shield segment 30c. As shown in FIG. 4C, the outer surface of third material component 32 can include a fastener 34 configured to secure the shield segment 30c to, for example, a surface that can be an inner housing surface.

Aspects of the present disclosure contemplate the presence of a plurality, or predetermined number of fasteners positioned on the exterior of the third material component that is shown in FIG. 4C as a "sleeve" dimensioned to receive the shield segment precursor 10c in the cylindrical, or "rolled" orientation. Aspects of the present disclosure further contemplate that fastener 34 can allow the shield segment 30c to be adjustably located on a surface or can further allow the shield segment 30c to be removed from or reattached to a surface without damaging the shield pillow. That is, the fastener 34 can be configured to be reusable, or to otherwise secure the shield segment 30c in a fixed or quasi-fixed location that can be adjusted in a predetermined fashion.

FIG. 5C is a longitudinal end view into the shield segment 30c shown as being formed in FIG. 4C. As shown in FIG. 5C, shield segment 30c includes the shield segment precursor 10c in cylindrical or "rolled" form within the third material component 32 that encases the shield segment precursor 10c. Shield segment precursor 10c further includes the second material component 14 (and having thickness d') as the outermost layer, with first material component 12 (having thickness d") located "inside of" second material component 14, and with open cell foam material 13 (having thickness d''') located "inside of first material component 12, and otherwise oriented at the innermost location, or "core" (also equivalently referred to herein as an "inner core") of shield segment 30c.

FIGS. 6 and 7 illustrate the shield segment 40 in a further finished form. As shown in FIGS. 6, 7 and 8, the shield segment 40 represents a shield segment that can be any of the shield segments 30a, 30b, and 30c, FIG. 6 shows two views of shield segment 40 (showing a shield segment first side 40a, and shield segment second side 40b) wherein the third material component 32 has had its third material component ends 33 sealed for the purpose of retaining the shield segment precursor in place within the third material component 32 that encases the shield segment 40. Third material component ends 33 can be sealed by any appropriate method that is determined to withstand the environmental conditions that the shield segment 40 can encounter in use (e.g. the environmental conditions, etc. in, e.g., space, etc.). Non-limiting sealing methods include, for example, fusing, stitching, etc. Fasteners 34 are shown affixed to shield segment second side 40b of the shield segment 40, with the fasteners affixed to the third material component 32. As shown in FIG. 6, the fastener 34 can be, for example, one half of a Velcro fastening system. Further, the fasteners can comprise any means useful for positioning the shield segment in a desired orientation for example, held in position proximate to an inner wall of a housing, etc. (e.g., hook and loop "Velcro"-type attachment, adhesive attachment, etc.), and the fasteners, if desired, can retain the shield segment in a desired orientation in a permanent or quasi-permanent arrangement (e.g., a removable arrangement), wherein the shield segments can be removed or relocated as desired such that the shield segments can be "reusable".

In another aspect, FIG. 7 shows a plurality of shield segments 40 oriented adjacent to one another. If desired the shield segments 40 can be joined to one another via any desired joining means including, in non-limiting fashion, joining the shield pillows via stitching, fusing or adhering by adding, for example, a glue, use of discrete fasteners, etc., to form a segmented shield 70. FIG. 7 illustrates the third material component 32 having its third material component ends 33 sealed for the purpose of retaining the contained shield segment precursors (of the type denoted herein as 10, 10a, 10b, 10c, and not visible in FIGS. 6 and 7) within the encasing third material component 32.

The protective shield segments (that when arranged in combination with one another form the segment shield) disclosed herein find utility in inhibiting the progress of high-velocity particles after such particles impact a structure and penetrate or otherwise pierce a structure housing. According to present aspects, particles that fragment upon impacting and penetrating the housing become absorbed by the shield segments that form the segmented shield, and the particles can be retained within the segmented shield itself. In this way the piercing or penetrating particles that pass into a housing (e.g. enter the housing), do not pass through the housing (e.g., exit the housing), which would ordinarily create a second and highly damaging breach in the housing at an exit site.

According to present aspects, the shield segments can be arranged within a structure, (e.g., a housing), including a housing for a boom assembly that can be segmented or folded into a stowed state and then repeatedly unfolded to a deployed state and returned to a stowed state, etc. The versatility and pliability of the shield segments facilitates the manufacture of such structure in that, in the case or a cylindrical housing made, for example, by rolling a planar sheet into a cylinder, the segmented shield can be oriented against a housing inner wall. In such a planar configuration of the housing, the shield segments can be oriented relative to one another lengthwise, and leaving a gap (e.g., with the "gap" representing a measurable distance between adjacent shield segments including, e.g., approximately a one inch gap between adjacent shield segments. For example, in this way, as the planar housing sheet or structure is manipulated into a cylinder, the shield segments will be moved closer together within the housing inner surface, and eliminating the gap that existed between the individual shield segments when the housing sheet was in a planar orientation. See FIG. 8.

FIG. 8 is non-limiting a perspective view of a flexible housing for a boom with the housing shown in a planar configuration representing a launch or stowed configuration. Shield segments can be arranged to collectively form a segmented shield that is located proximate to what will become the housing inner surface when the housing is shaped into a deployed cylindrical shape (the cylindrical shape as shown in FIG. 9). FIG. 8 shows a 100 boom assembly in a stowed state, with the boom assembly including a housing 102 in a planar state that is wound around a reel 104. The partially unwound housing 102 as shown in FIG. 8 further includes a plurality of shield segments 40 affixed to the housing inner surface 102a of housing 102. The housing as shown is a structural element that can support, for example, a boom assembly for a solar blanket array of the type of the type deployed from, for example, a spacecraft, space station, satellite, etc.

As shown in FIG. 8, for at least space-saving purposes, the housing 102 in the stowed state can be substantially planar and, because the housing is made from a flexible material, the housing can be rolled, spooled, or wound about a reel 104 or other object functioning as a spooling device (e.g., a take-up reel that wind the housing material, and that can also unwind or release the housing material from the reel, etc.). The housing 102 has first housing side 102b and second housing side 102c. Although not shown, during deployment, the full length of the housing 102 can unroll from the reel 104. When moving from a deployed state to a stowed state, the reel 104 can wind or "take up" the length of the housing onto the reel to return the housing into a rolled and planar configuration as shown in FIG. 8. During deployment to a deployed state and deployed configuration, the housing first edge 102b and housing second edge 102c can then be upwardly curled toward one another and retained in a curled or arced orientation such that the housing first edge 102b and housing second edge 102c are proximate to one another, and such that the once planar housing becomes shaped into a tube or an otherwise substantially cylindrical shape, with the shield segments formed collectively into a segmented shield, and retained in a position affixed into position that is adjacent and proximate to the housing inner surface 102a of the housing 102. The cylindrical housing orientation with the segmented shield in position within the housing is shown in FIG. 9.

As further shown in FIG. 8, the shield segments 40 can be positioned on the housing inner surface 102a of the housing 102 (when the housing is in a planar form) in an orientation where the shield segments 40 are laterally spaced a predetermined distance from one another while they are positioned longitudinally adjacent to one another. The predetermined space between shield segments 40 shown in FIG. 8 as segmented shield gaps 106 can be a distance necessary to allow the shield segments 40 to be brought into contact with adjacently-oriented shield pillows during the curling of the housing into the fully deployed position of the housing in the cylindrical housing form (shown in FIG. 9), together, the individual shield segments 40 collectively form the segmented shield 103.

If the spacing between the shield segments is too small, the shield segments may impede the proper deployment of the housing as it is curled into its deployed cylindrical position, or the inadequately spaced shield segments may adversely impact the desired cylindrical shape of the housing in the deployed position. If the spacing between the shield segments is too great, undesirable gaps can occur between the shield segments when the housing is oriented into the fully deployed and substantially cylindrical, or tubular, shape.

According to present aspects, when the housing is moved from the stowed state into the deployed state (e.g., and formed into the cylindrical shape) it is desirable for the shield segments to be brought into contact with one another along the shield segment sides, with the shield segments positioned adjacent to the housing inner surface. Again, according to present aspects, the predetermined spacing of the shield segments from one another that is visible when the housing is in the stowed state (as shown in FIG. 8) is reduced to substantially zero once the housing is in the cylindrical orientation in the fully deployed state (as shown in FIG. 9).

FIG. 9 is a non-limiting end view of the housing 102 (of the type shown in FIG. 8) now in a deployed configuration with the flexible housing shaped into a cylinder, and with the shield segments having been formed into a segmented shield 103 that is located proximate to the housing inner surface 102a of the flexible housing 102 that is now shaped into a deployed state, and cylindrical state according to present aspects.

As shown in FIG. 9, the housing 102 has now been curled by bringing the housing first edge 102b and housing second edge 102c (shown in FIG. 8) into close proximity to one another and appearing in FIG. 9 such that the housing first edge 102b and housing second edge 102c are joined and are not separately visible, although present aspects contemplate a closed and cylindrical housing orientation including an orientation where the housing first and second edges 102b, 102c (shown in FIG. 8) are not joined or completely "touching", but are nevertheless considered to be oriented proximate to one another. The shield segments 40 that are proximate to, adjacent to, and/or affixed to the housing inner surface 102a have "moved" into a position that is closer to one another (e.g., an individual shield segment 40 is closer to the adjoining or adjacent shield segment 40) due to the angles created by the arcing, or curling or the housing 102 as the housing is moved into the deployed position. As mentioned previously, and according to present aspects, in the deployed state shown in FIG. 9, the segmented shield gaps 106 that were visible between the shield segments 40 in the stowed state, and as shown in FIG. 8, are no longer visible in the deployed state, as the distance between the shield segments in the stowed state has been reduced to zero in the deployed state as shown in FIG. 9.

According to present aspects, in further consideration of weight of structures, such as, for example, solar array blankets and other arrays in space, etc., materials used in the manufacture of, for example supporting booms or structural booms for solar blanket arrays can be constructed from high strength materials that are also light in weight. For example, the housings for the booms, according to present aspects, can comprise carbon fiber materials including, for example, a predetermined number of layers of oriented carbon fiber fabric that can be impregnated with epoxy resin. The material selection produces housings having a thin wall that is flexible, durable, resilient, strong, etc. The material selection balances design and engineering considerations concerning the wall thickness against the overall weight of the boom structures, and the supporting strength of the boom required to structurally support, for example, solar blanket arrays or other equipment and arrays, etc., in a space environment, etc. For example, according to present aspects, the selected carbon fiber materials for construction of solar panel boom housings can be selected to deliver the required mission performance parameters by constructing tubular (e.g., cylindrical, or substantially cylindrical) boom housings having an average wall thickness of about 0.030" for a cylindrical boom having a diameter of about 6.5".

The construction and use of the individual shield segment, and the orienting and integrating of the plurality of shield segments into the housing of the structural boom support of, for example, a solar blanket array, provide significant boom/housing manufacturing flexibility. The shield segments can be positioned and/or secured on a housing surface that will become a housing inner surface as substantially planar or partially shaped sheets of carbon fiber housing material comprising the integrated shield segments are then formed into a non-planar housing orientation such as, for example, a cylinder (e.g., formed by providing force and subsequent clamping, fastening, etc., as necessary to join ends or edges of a carbon fiber material sheet into a substantially cylindrical form, etc.).

According to present aspects, the shield segments are lightweight and can be manipulated, for example, during installation. Such manipulation of the shield segments can influence the final geometry of the shield segments in the deployed orientation for the structures they will protect from through-and-through penetration. For example, as well as observing a lengthwise substantially cylindrical shape and a substantially circular cross-sectional geometry, present aspects further contemplate presently disclosed shield segment precursors, shield segments, and segmented shields that can be compressed or otherwise shaped, deformed, etc., such that the shield segment precursors, shield segments and segmented shields can be shaped from an initial shape into a final shape having, for example, an oval, elliptical, irregular, regular, or other cross-sectional geometry (e.g., along the width, height, length of the shield pillow, etc.), while retaining the particle-impeding properties and/or other properties of the shield, shield segments, and the shield pillow, According to present aspects, the presently disclosed shield segment precursors, shield segments, and segmented shields can be effectively installed in structures that must withstand exposure to the impact of very high-velocity particles. The low density of the presently disclosed shield segments and segmented shields formed therefrom is particularly useful as penetration barriers for sub-assemblies, assemblies, and structures where additional weight is a concern. For example, at an approximate density of about 0.45 g/cm$^3$, according to present aspects, a 16" shield segment can exhibit the aforementioned barrier properties and penetration inhibition against micrometeoroids and other particles (e.g., particles having an average diameter of less than 3 mm travelling at a velocity ranging from about 1 to about 70 km/sec., etc.) while only having an average weight of about 12 ounces.

By way of example, (and understanding that the shield segments may not need to be oriented along the inner surface of a housing along the entire length of the housing) for a housing used for a supporting or structural boom associated with a solar blanket array that has an overall deployed length of about 60 feet, and having, for example, a segmented shield having six shield segments within a predetermined length of a section of the boom housings in a double boom array, the weight added to an assembly by the presence of the segmented shield can be held to a combined added shield weight of about 10 pounds or less.

Further, while the shield segments and segmented shields disclosed herein are illustrated for use in conjunction with, or to otherwise modify, structures such as, for example, booms or cylindrical tubes, or other structures that can include, for example, deployable structures on interstellar or space vehicles (e.g., spacecraft, satellites, space stations, etc.), the shields and shield pillows disclosed herein, and according to further aspects, can be useful additions to any structures that require a lightweight shield or barrier for inhibiting the through-and-through penetration of extremely high velocity particles (e.g., particles having an average diameter of from about 1 to about 3 mm travelling at a velocity ranging from about 1 to about 70 km/sec.). While such high velocities are typically attained in very thin atmospheres, such as those encountered in space, the shield segments and segmented shields disclosed herein also can be used to modify and otherwise reinforce structures and objects found in terrestrial and marine environments, as well as provide desired lightweight reinforcement and barrier functions for aircraft, rotorcraft, etc.

FIG. 10 is a flowchart outlining a method 1200 for making the shield segments, according to present aspects. As shown in FIG. 10, method 1200 includes providing 1202 a first material component that can be in the form of a sheet having a predetermined number of layers. As stated herein, the first material component can be a first fiber material that can include, for example, a ballistic performance fabric material that can include, for example aramid fibers, and that can include, for example, poly-paraphenylene terephthalamide (e.g., sold commercially as Kevlar®, DuPont). The first material component has a tensile strength of at least about 3620 MPa and a relative density of about 1.44 and further includes a first material component leading edge and a first material component trailing edge, As shown in FIG. 10, method 1200 further includes providing 1204 a second material component, for example in sheet form with the second material component that includes a second fiber material that is different from the first fiber material. As stated above, according to further present aspects, the second material component can be, for example, second fiber material that is a continuous filament aluminum oxide material (e.g., sold commercially as Nextel™, 3M Company, with Nextel™ 312, being preferred). The second fiber material has a high heat dispersivity value referred to herein as, a "high temperature fiber" that can withstand temperatures up to at least about 2000°. Further, the second fiber material is a continuous filament aluminum oxide material that is dimensionally stable; and having a low elongation and low shrinkage at operating temperatures up to at least about 2000° F., as well as low thermal conductivity and a low porosity. The second material component further includes a second material component leading edge and a second material component trailing edge.

Method 1200 further includes adjoining 1206 or otherwise orienting the first material component proximate to the second material component to form a shield sheet in a sheet-like form. According to present aspects, the first material component trailing edge can overlap the second material component leading edge. Method 1200 further includes rolling 1208 the first material component to form a predetermined thickness of first material component and rolling 1210 the second material component to substantially surround the first material component thickness and to form a predetermined second material component thickness "outside of" or "surrounding" the first material component thickness. Method 1200 further includes providing 1212 a third material component that includes a third material fiber material that is different from the first fiber material and that is different from the second fiber material, followed by substantially surrounding 1214 the second material component with the third material component. The third material component can be in the form of a sleeve or other form that can receive the combined first sand second material components in a rolled orientation as shield segment precursors such that, for example, the rolled first and second material components (e.g., the shield segment precursors) can be inserted into the third material component in the sleeve form, to form the shield segment.

In an alternative, in method 1200 as outlined in FIG. 10, the second material component can be substantially surrounded or "wrapped" by the third material component. The third material can be, for example, one or more layers thick, with the third material component including a silica fiber cloth such as, for example, material known as Beta cloth; a woven silica fiber that will not burn. In addition, to increase material stability and otherwise impart predetermined characteristics to the third material component, the silica fibers of Beta cloth can be coated with, for example, polytetrafluoroethylene (PTFE), sold commercially as TEFLON™, Chemours Company, FC. LLC).

FIG. 11 is a flowchart outlining a method 1300 for making the shield pillows, according to present aspects. As shown in FIG. 11, method 1300 includes providing 1202 a first material component that can be in the form of a sheet having a predetermined number of layers, and providing 1204 a second material component, for example in sheet form with the second material component that includes a second fiber material that is different from the first fiber material, followed by overlapping 1302 the first material component trailing edge and the second material component leading edge. Method 1300 further includes rolling 1208 the first material component to form a predetermined thickness of first material component and rolling 1210 the second material component to substantially surround the first material component thickness and to form a predetermined second material component thickness to form the shield segment precursor. Method 1200 further includes providing 1212 a third material component that includes a third material fiber material that is different from the first fiber material and that is different from the second fiber material, followed by substantially surrounding 1214 the second material component with the third material component to form the shield segment. The first material component, second material component and third material component can have the characteristics as outlined in the description of FIG. 10.

FIG. 12 is a flowchart outlining another method according to present aspects. As shown in FIG. 12, method 1400 includes providing 1402 an open cell foam material, and adjoining 1404 or otherwise orienting an open cell foam material proximate to the first material component. The open cell foam material can be a low-density open cell foam polyethylene based foam or a polyimide foam such as that sold commercially as SOLIMIDE® (Boyd Corp., Pleasanton, Calif.). Method 1400 further includes providing 1202 a first material component that can be in the form of a sheet having a predetermined number of layers, and providing 1204 a second material component, for example in sheet form with the second material component that includes a second fiber material that is different from the first fiber material, followed by overlapping the first material component trailing edge and the second material component leading edge. Method 1400 further includes rolling 1208 the first material component to form a predetermined thickness of first material component and rolling 1210 the second material component to substantially surround the first material component thickness and to form a predetermined second material component thickness to form the shield segment precursor. Method 1400 further includes providing 1212 a third material component that includes a third material fiber material that is different from the first fiber material and that is different from the second fiber material, followed by substantially surrounding 1214 the second material component with the third material component to form the shield segment. The first material component, second material component and third material component can have the characteristics as outlined in the description of FIGS. 10 and/or 11.

FIG. 13 is a flowchart outlining a method 1500 for making the shield pillows, according to present aspects. As shown in FIG. 13, method 1500 includes providing 1402 an open cell foam material that can have an open cell foam material leading edge and an open cell foam material trailing edge. Method 1500 further includes providing 1202 a first material component that can be in the form of a sheet having a predetermined number of layers, with the first material component having a first material component leading edge and a first material component trailing edge, and overlapping 1502 the open cell foam material trailing edge with the with the first material component leading edge. The method further includes providing 1204 a second material component, for example in sheet form with the second material component that includes a second fiber material that is different from the first fiber material, with the second material component having a second material component leading edge and a second material component trailing edge, followed by overlapping 1504 the first material component trailing edge and the second material component leading edge. Method 1500 further includes rolling 1506 the open cell foam material to form a predetermined thickness of open cell foam material, followed by rolling 1208 the first material component to substantially surround the open cell foam material and to form a predetermined thickness of first material component and rolling 1210 the second material component to substantially surround the first material component thickness and to form a predetermined second material component thickness, and providing 1212 a third material component that includes a third material fiber material that is different from the first fiber material and that is different from the second fiber material, followed by substantially surrounding 1214 the second material component with the third material component. The first material component, second material component and third material component can have the characteristics as outlined in the description of FIGS. 10, 11, and/or 12.

FIG. 14 is a flowchart outlining a method 1600 for making a structure comprising the shield disclosed shield segments and segmented shield, according to present aspects. As shown in FIG. 14, method 1600 includes providing 1602 a housing with the housing including a housing inner surface and a housing outer surface, and orienting 1604 a plurality of shield segments proximate to, or adhering the plurality of shield segments to the housing inner surface, with the plurality of shield segments forming a segmented shield and with the shield segments including the first material component, second material component and third material component as described and characterized in FIGS. 10, 11, 12, and/or 13.

As used herein, the phrase "at least one of," when used with a list of items, means different combinations of one or more of the listed items may be used, and only one of each item in the list may be used. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The present aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. An apparatus comprising:
a first material component, said first material component comprising a first fiber material, said first fiber material having a tensile strength of at least about 3620 MPa and a relative density of about 1.44, said first material component having a first material component thickness;
a second material component, said second material component comprising a second fiber material that is different from the first fiber material, said second fiber material comprising a continuous filament ceramic material, said second material component having a second material component thickness, said second material component configured to substantially surround the first material component;
a third material component, said third material component comprising a third fiber material, said third fiber material comprising a silica fiber cloth material, said third fiber material configured to substantially surround the second fiber material; wherein the first material component is configured into a rolled configuration comprising the first material component thickness, said rolled configuration further comprising an inner core, said inner core bounded by the first material component; and
wherein the second material component is configured into a rolled configuration about the first material component thickness, to form a shield segment, said second material component comprising a second material component thickness.

2. The apparatus of claim 1, further comprising:
a predetermined amount of open cell foam material, said predetermined amount of open cell foam material oriented within the inner core, said predetermined amount of open cell foam material substantially surrounded by the first material component in the rolled configuration.

3. The apparatus of claim 1, further comprising a plurality of shield segments oriented proximate to one another to form a segmented shield.

4. The apparatus of claim 1, wherein the first fiber material comprises poly-paraphenylene terephthalamide.

5. The apparatus of claim 1, wherein the second fiber material comprises aluminum oxide.

6. The apparatus of claim 1, wherein the second fiber material comprises a continuous filament aluminum oxide material.

7. The apparatus of claim 1, wherein the first fiber material component comprises about 70 layers of first material component.

8. The apparatus of claim 1, wherein the second material component comprises a predetermined number of second material component layers ranging from about 8 to about 12 layers.

9. The apparatus of claim 1, wherein the third fiber material comprises a silica fiber cloth material.

10. The apparatus of claim 9, wherein the silica fiber cloth material comprises polytetrafluoroethylene.

11. A method comprising:
providing a first material component, said first material component having a tensile strength of at least about 3620 MPa and a relative density of about 1.44, said first material component comprising a first material component leading edge and a first material component trailing edge; and
providing a second material component, said second material component comprising aluminum oxide fibers, said second material component positioned adjacent to the first material component, said second material component comprising a second material component leading edge and a second material component trailing edge said second material component leading edge overlapping the first material component trailing edge;
adjoining the first material component trailing edge and the second material
component leading edge;
rolling the first material component into a first material component rolled configuration to form a predetermined first material component thickness, said predetermined first material component thickness further comprising an inner core, said inner core bounded by the first material component;
rolling the second material component to substantially surround the first material component and to form a predetermined second material component thickness;
providing a third material component, said third material component comprising a third fiber material, said third fiber material comprising a silica fiber cloth material; and
substantially surrounding the second material component with the third material component material, said third material component material comprising a predetermined amount of silica fiber cloth material to form a shield segment.

12. The method of claim 11, wherein in the step of adjoining the first material component trailing edge and the second material component leading edge, further comprising:
overlapping the first material component trailing edge and the second material component leading edge.

13. The method of claim 11, before the step of providing a predetermined number of layers of first material component, the method further comprising;
   providing an open cell foam material, said open cell foam material comprising an open cell foam material leading edge and an open cell foam material trailing edge;
   adjoining the open cell foam material trailing edge and the first material component leading edge;
   forming a predetermined thickness of the open cell foam material; and
   rolling the first material component onto the open cell foam material to substantially surround the open cell foam material.

14. The method of claim 13, wherein in the step of adjoining the open cell foam material and the first material component leading edge, further comprising;
   overlapping the first material component leading edge and the open cell foam material.

15. The method of claim 13, wherein the open cell foam material comprises an open cell foam material sheet.

16. The method of claim 13, wherein the open cell foam material comprises an open cell foam material in a block-like form.

17. The method of claim 13, wherein the first fiber material comprises poly-paraphenylene terephthalamide.

18. The method of claim 13, wherein the second fiber material comprises aluminum oxide.

19. The method of claim 13, wherein the second fiber material comprises a continuous filament aluminum oxide material.

20. The method of claim 13, wherein the silica fiber cloth material comprises polytetrafluoroethylene.

\* \* \* \* \*